(12) United States Patent
Baluja et al.

(10) Patent No.: US 8,055,664 B2
(45) Date of Patent: Nov. 8, 2011

(54) INFERRING USER INTERESTS

(75) Inventors: Shumeet Baluja, Santa Clara, CA (US);
Yushi Jing, Mountain View, CA (US);
Dandapani Sivakumar, Cupertino, CA (US); Jay Yagnik, Mountain View, CA (US)

(73) Assignee: Google Inc., Mountain View, CA (US)

( * ) Notice: Subject to any disclaimer, the term of this patent is extended or adjusted under 35 U.S.C. 154(b) by 493 days.

(21) Appl. No.: 11/742,995

(22) Filed: May 1, 2007

(65) Prior Publication Data
US 2008/0275861 A1    Nov. 6, 2008

(51) Int. Cl.
*G06F 17/30* (2006.01)
*G06Q 30/00* (2006.01)

(52) U.S. Cl. ...................... 707/749; 705/14.7

(58) Field of Classification Search ............ None
See application file for complete search history.

(56) References Cited

U.S. PATENT DOCUMENTS

| | | | |
|---|---|---|---|
| 5,724,521 A | 3/1998 | Dedrick | |
| 5,740,549 A | 4/1998 | Reilly et al. | |
| 5,848,397 A | 12/1998 | Marsh et al. | |
| 5,918,014 A | 6/1999 | Robinson | |
| 5,948,061 A | 9/1999 | Merriman | |
| 6,009,422 A | 12/1999 | Ciccarelli | |
| 6,026,368 A | 2/2000 | Brown et al. | |
| 6,044,376 A | 3/2000 | Kurtzman, II | |
| 6,078,914 A | 6/2000 | Redfern | |
| 6,144,944 A | 11/2000 | Kurtzman, II et al. | |
| 6,167,382 A | 12/2000 | Sparks et al. | |
| 6,256,648 B1 | 7/2001 | Hill et al. | |
| 6,269,361 B1 | 7/2001 | Davis et al. | |
| 6,389,372 B1 | 5/2002 | Glance et al. | |
| 6,401,075 B1 | 6/2002 | Mason et al. | |
| 6,549,896 B1 | 4/2003 | Candan et al. | |
| 6,594,673 B1 | 7/2003 | Smith et al. | |
| 6,792,419 B1 | 9/2004 | Raghavan | |
| 6,985,882 B1 | 1/2006 | Del Sesto | |
| 7,039,599 B2 | 5/2006 | Merriman | |
| 7,136,875 B2 | 11/2006 | Anderson et al. | |
| 7,689,682 B1 | 3/2010 | Eldering et al. | |
| 7,765,218 B2 | 7/2010 | Bates et al. | |
| 7,801,956 B1 | 9/2010 | Cumberbatch et al. | |
| 2002/0023230 A1* | 2/2002 | Bolnick et al. ............ | 713/202 |

(Continued)

FOREIGN PATENT DOCUMENTS

EP    1 544 729 A    6/2005

(Continued)

OTHER PUBLICATIONS

95/001,073, Reexamination of Stone et al., Sep. 30, 2004.

(Continued)

*Primary Examiner* — Tarek Chbouki

(74) *Attorney, Agent, or Firm* — Fish & Richardson P.C.

(57) ABSTRACT

The subject matter of this specification can be embodied in, among other things, a method that includes determining, for a portion of users of a social network, label values each comprising an inferred interest level of a user in a subject indicated by a label, associating a first user with one or more second users based on one or more relationships specified by the first user, and outputting a first label value for the first user based on one or more second label values of the one or more second users.

61 Claims, 22 Drawing Sheets

U.S. PATENT DOCUMENTS

| | | | |
|---|---|---|---|
| 2002/0116466 | A1 | 8/2002 | Trevithick et al. |
| 2002/0120506 | A1 | 8/2002 | Hagen |
| 2002/0124053 | A1 | 9/2002 | Adams et al. |
| 2003/0050977 | A1 | 3/2003 | Puthenkulam et al. |
| 2004/0042599 | A1 | 3/2004 | Zaner et al. |
| 2004/0088325 | A1 | 5/2004 | Elder et al. |
| 2004/0122803 | A1 | 6/2004 | Dom et al. |
| 2004/0143841 | A1 | 7/2004 | Wang et al. |
| 2004/0148275 | A1 | 7/2004 | Achlioptas |
| 2004/0215793 | A1 | 10/2004 | Ryan et al. |
| 2004/0267604 | A1 | 12/2004 | Gross |
| 2005/0091202 | A1 | 4/2005 | Thomas |
| 2005/0114325 | A1 | 5/2005 | Liu et al. |
| 2005/0125308 | A1 | 6/2005 | Puentes et al. |
| 2005/0125408 | A1 | 6/2005 | Somaroo et al. |
| 2005/0144069 | A1 | 6/2005 | Wiseman et al. |
| 2005/0149395 | A1 | 7/2005 | Henkin et al. |
| 2005/0154639 | A1 | 7/2005 | Zetmeir |
| 2005/0171832 | A1 | 8/2005 | Hull et al. |
| 2005/0198031 | A1 | 9/2005 | Pezaris et al. |
| 2005/0216300 | A1 | 9/2005 | Appelman et al. |
| 2005/0278443 | A1 | 12/2005 | Winner et al. |
| 2006/0004704 | A1 | 1/2006 | Gross |
| 2006/0031121 | A1 | 2/2006 | Speicher |
| 2006/0069584 | A1 | 3/2006 | Bates et al. |
| 2006/0085259 | A1* | 4/2006 | Nicholas et al. ............... 705/14 |
| 2006/0136098 | A1 | 6/2006 | Chitrapura et al. |
| 2006/0165040 | A1* | 7/2006 | Rathod et al. ............... 370/335 |
| 2006/0184617 | A1* | 8/2006 | Nicholas et al. ............. 709/203 |
| 2006/0190225 | A1 | 8/2006 | Brand |
| 2006/0200435 | A1 | 9/2006 | Flinn et al. |
| 2006/0204142 | A1 | 9/2006 | West et al. |
| 2006/0218577 | A1* | 9/2006 | Goodman et al. ............. 725/32 |
| 2006/0247940 | A1* | 11/2006 | Zhu et al. ........................ 705/1 |
| 2006/0248573 | A1* | 11/2006 | Pannu et al. ..................... 726/1 |
| 2006/0271460 | A1 | 11/2006 | Hanif |
| 2006/0282328 | A1 | 12/2006 | Gerace et al. |
| 2006/0294084 | A1 | 12/2006 | Patel et al. |
| 2006/0294134 | A1 | 12/2006 | Berkhim et al. |
| 2007/0005341 | A1 | 1/2007 | Burges et al. |
| 2007/0043688 | A1 | 2/2007 | Kountz et al. |
| 2007/0043766 | A1* | 2/2007 | Nicholas et al. .......... 707/104.1 |
| 2007/0050446 | A1 | 3/2007 | Moore |
| 2007/0106551 | A1* | 5/2007 | McGucken .................... 705/10 |
| 2007/0121843 | A1 | 5/2007 | Atazky et al. |
| 2007/0124721 | A1* | 5/2007 | Cowing et al. ............... 717/100 |
| 2007/0218900 | A1 | 9/2007 | Abhyanker |
| 2007/0288462 | A1 | 12/2007 | Fischer et al. |
| 2008/0010275 | A1 | 1/2008 | Lee et al. |
| 2008/0091834 | A1* | 4/2008 | Norton .......................... 709/229 |
| 2008/0103784 | A1* | 5/2008 | Wong et al. ....................... 705/1 |
| 2008/0103877 | A1* | 5/2008 | Gerken ........................... 705/10 |
| 2008/0104079 | A1* | 5/2008 | Craig ................................. 707/9 |
| 2008/0104225 | A1* | 5/2008 | Zhang et al. .................. 709/224 |
| 2008/0120308 | A1 | 5/2008 | Martinez et al. |
| 2008/0120411 | A1* | 5/2008 | Eberle ........................... 709/225 |
| 2008/0126476 | A1* | 5/2008 | Nicholas et al. ............. 709/203 |
| 2008/0140650 | A1* | 6/2008 | Stackpole ......................... 707/5 |
| 2008/0155080 | A1* | 6/2008 | Marlow et al. ............... 709/223 |
| 2008/0159590 | A1 | 7/2008 | Yi et al. |
| 2008/0162431 | A1* | 7/2008 | Xu et al. ........................... 707/3 |
| 2008/0195657 | A1 | 8/2008 | Naaman et al. |
| 2008/0215416 | A1 | 9/2008 | Ismalon et al. |
| 2008/0243607 | A1* | 10/2008 | Rohan et al. .................... 705/14 |
| 2008/0249966 | A1* | 10/2008 | Luege Mateos ............... 706/11 |
| 2008/0275899 | A1* | 11/2008 | Baluja et al. ................. 707/102 |
| 2009/0024548 | A1* | 1/2009 | Zhu et al. ........................ 706/21 |
| 2009/0063284 | A1 | 3/2009 | Turpin et al. |
| 2009/0076800 | A1 | 3/2009 | Li et al. |
| 2009/0112701 | A1 | 4/2009 | Turpin et al. |
| 2009/0248661 | A1 | 10/2009 | Bilenko et al. |

FOREIGN PATENT DOCUMENTS

| | | |
|---|---|---|
| WO | WO 97/21183 | 6/1997 |
| WO | WO2004/111771 | 12/2004 |
| WO | WO2006/121575 | 11/2006 |

OTHER PUBLICATIONS

95/001,061, Reexamination of Stone et al., Sep. 3, 2002.
95/001,069, Reexamination of Dean et al., Jul. 11, 2002.
95/001,068, Reexamination of Stone et al., Dec. 7, 2002.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www. Archive.org, Apr. 12, 1997 and Feb 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Information Access Technologies, Inc., Aaddzz brochure, "The Best Way To Buy And Sell Web Advertising Space," © 1997.
Information Access Technologies, Inc., Aaddzz.com website archive from www. Archive.org, archived on Jan. 30, 1998.
Zeff, R. et al., Advertising on the Internet, 2nd Ed., John Wiley & Sons, 1999.
Dedrick, R., Interactive Electronic Advertising, IEEE, 1994.
Dedrick, R., A Consumption Model for Targeted Electronic Advertising, Intel Architecture Labs, IEEE, 1995.
Request for Reexamination of U.S. Patent No. 7,240,025 B2, Control No. 95/001,073.
Request for Reexamination of U.S. Patent No. 6,446,045 B1, Control No. 95/001,061.
Request for Reexamination of U.S. Patent No. 7,249,059 B2, Control No. 95/001,069.
Request for Reexamination of U.S. Patent No. 6,829,587 B2, Control No. 95/001,068.
"Mining the Web's Link Structure" by Chakrabarti et al., for IEEE *Computer* Magazine, Aug. 1999, pp. 60-67.
"Text Categorization and Support Vector Machines" by Pilaszy, for *Computer Science*, vol. 1398, 1998, 10 pages.
"Machine Learning in Automated Text Categorization" by Sebastiani, for *ACM Computing Surveys*, vol. 34, No. 1, Mar. 2002, pp. 1-47.
"The Anatomy of a Large-Scale Hypertextual Web Search Engine" by Brin et al., for *Computer Networks*, 1998, pp. 1-26.
"The Web as a graph: measurements, models, and methods" by Kleinberg et al., for *Proceedings of the International Conference on Combinatorics*, 1999, 18 pages.
"Topic-Sensitive PageRank" by Haveliwala et al., for *IEEE Transactions on Knowledge and Data Engineering*, 2003, 10 pages.
"Evaluating Collaborative Filtering Recommender Systems" by Herlocker et al., for *ACM Transactions on Information Systems*, vol. 22, No. 1, Jan. 2004, pp. 5-53.
"Applying Collaborative Filtering to Usenet News" by Konstan et al., for *Communications of the ACM*, Mar. 1997, vol. 40, No. 3, pp. 77-87.
"A Comparative Study on Feature selection and Classification methods Using Gene Expression Profiles and Proteomic Patterns" by Liu et al., for *Genome Informatics* 13:, pp. 51-60, 2002.
R. Datta et al., "Image retrieval: Ideas, influences, and trends of the new age", *ACM Computing Surveys*, vol. 40. No. 2, 2008.
Smeulders et al., "Content-based image retrieval at the end of the early years", *IEEE Transactions on Pattern Analysis and Machine Intelligence (TPAMI)*, vol. 22, No. 12, pp. 1349-1380, 2000.
Ma et al., "A toolbox for navigating large image databases", *Multimedia System*, vol. 3, No. 7, pp. 184-198, 1999.
Joshi et al., "The story picturing engine—a system for automatic text illustration", *ACM Transactions on Multimedia, Computing, Communications and Applications*, vol. 2, No. 1, pp. 68-89, 2006.
Fergus et al., "A visual category filter for Google images," in *Proc. 8th European Conference on Computer Vision (ECCV)*, pp. 242-256, 2004.
U.S. Appl. No. 60/522,718, Liew et al.
Fergus et al., "Object class recognition by unsupervised scale-invarint learning" in *Proc. Conference on Computer Vision and Pattern Recognition (CVPR)*, vol. 2, pp. 264-271, 2003.

Friedman et al., Bayesian network classifiers *Machine Learning*, vol. 29, pp. 131-163, 1997.

D.G. Lowe, "Distinctive Image Features from Scale-Invariant Keypoints", *International Journal of Computer Vision (IJCV)*, vol. 60, No. 2, pp. 91-110, 2004.

Xing et al., "Distance metric learning, with applications to clustering with side-information", in *Proc. 15$^{th}$ Conference on Advances in Neural Information Processing Systems (NIPS)*, vol. 15, pp. 450-459, 2002.

Weinberger et al., "Distance metric learning for large margin nearest neighbor classification", in *Proc. 18$^{th}$ Conference on Advances in Neural Information Processing Systems (NIPS)*, vol. 18, pp. 1437-1480, 2006.

Frome et al., "Learning globally-consistent local distance functions for shape-based image retrieval and classification", in *Proc. 11$^{th}$ IEEE International Conference on Computer Vision (ICCV)*, pp. 1-8, 2007.

Simon et al., "Scene summarization for online image collections", in *Proc. 12$^{th}$ International Conference on Computer Vision (ICCV)*, 2007.

Baluja et al., ideo suggestion and discover for YouTube: Taking random walks through the view graph:, in *Proc. 17$^{th}$ International World Wide Web Conference (WWW)*, 2008 to appear.

Hsu et al. "Video search reranking through random walk over document-level context graph" in *Proc. 15$^{th}$ International Conference on Multimedia*, pp. 971-980, 2007.

J.M. Kleinberg, "Authoritative sources in a hyperlinked environment", *Journal of the ACM*, vol. 46, No. 5, pp. 604-632, 1999.

Frey et al., "clustering by passing messages between data points", *Science*, vol. 315, pp. 972-276, 2007.

Kondor et al., "Diffusion kernels on graphs and other discrete structures", in *Proc. 19$^{th}$ International Conference on Machine Learning (ICML)*, pp. 315-322, 2002.

Jing et al., "Canonical image selection from the web", in *Proc. 6$^{th}$ International Conference on Image and Video Retrieval (CIVR)*, pp. 280-287, 2007.

Harris et al., "A combine corner and edge detector", in *Proc. 4$^{th}$ Alvey Vision Conference*, pp. 147-151, 1988.

Belongie et al, "Shape matching and object recognition using shape contexts", *IEEE Transactions on Pattern Analysis and Machine Intelligence (TPAMI)*, vol. 24, No. 24, pp. 509-522, 2002.

Lazebnik et al., A sparse texture representation using affine-invariant regions, in *Proc. Conference on Computer Vision and Pattern Recognition (CVPR)*, vol. 2, pp. 319-324, 2003.

Mikolajczyk et al., "A performance evaluation of local descriptors", *IEEE Transactions on Pattern Analysis and Machine Intelligence (TPAMI)*, vol. 27, No. 10, pp. 1615-1630, 2005.

Winder et al., "Learning local image descriptors", in *Prof. Conference on Computer Vision and Pattern Recognition (CVPR)*, 2007.

Bay et al., "surf: Speeded up robust features", in *Proc. 9$^{th}$ International European Conference on Computer Vision (ECCV)*, pp. 404-417, 2006.

Nister et al., "Scalable recognition with a vocabulary tree", in *Proc. Conference on Computer vision and Pattern Recognition (CVPR)*, vol. 2, pp. 2161-2168, 2006.

Ke et al., "Efficient near-duplicate detection and sub-image retrieval", in *Proc. ACM International Conference on Multimedia (ACM MM)*, pp. 869-876, 2004.

Ke et al., "Pca-sift: A more distinctive representation for local image descriptors", in *Proc. Conference on Computer Vision and Pattern Recognition (DVPR)*, vol. 2, pp. 506-516, 2004.

Nowak et al., "Learning visual similarity measures for comparing never seen objects", in *Proc. Conference on Computer Vision and Pattern Recognition (CVPR)*, 2007.

Philbin et al., "Object retrieval with large vocabularies and fast spatial matching", in *Proc. Conference on Computer Vision and Pattern Recognition (CVPR)*, 2007.

Datar et al., Locality-sensitive hashing scheme based on p-stable distributions:, in *Proc. 20$^{th}$ Symposium on Computational Geometry (SCG)*, pp. 253-262, 2004.

Carson et al., "Blob-world: image segmentation using expectation-maximization and its application to image querying", *IEEE transactions on Pattern Analysis and Machine Intelligence (TPAMI)*, vol. 24, No. 8, pp. 1026-1038, 2002.

He et al., "Imagerank: spectral techniques for structural analysis of image database", in *Proc. International Conference on Multimedia and Expo*, vol. 1, pp. 25-28, 2002.

Indyk et al., "Approximate nearest neighbor—towards removing the curse of dimensionality", in *Proc. 30$^{th}$ ACM Symp. On Computational Theory*, pp. 604-613, 1998.

Park et al., "Majority based ranking approach in web image retrieval", *Lecture Notes in Computer Science*, vol. 27-28, pp. 499-504, 2003.

Pentland et al., "Content-based manipulation of image databases", *International Journal of Computer Vision (IJCV)*, vol. 18, No. 3, pp. 233-254, 1996.

Schindler et al., "city-scale location recognition", in *Proc. Conference on Computer Vision and Pattern Recognition (CVPR)*, 2007.

Uchihashi et al., "Content-free image retrieval by combinations of keywords and user feedbacks", in *Proc. 5$^{th}$ International Conference on Image and Video Retrieval (CIVR)*, pp. 650-659, 2005.

Yang, Wan-Shiou et al. "Mining Social Networks for Targeted Advertising" *Proceedings of the 39$^{th}$ Hawaii International Conference on System Sciences—2006*.

Boccaletti, et al. "Complex networks: Structure and dynamics" *Physics Repots* vol. 424 (2006).

Accounts, at http://www.cs.rice.edu/~ssiyer/accounts/, as available via the Internet and printed on Jul. 29, 2004.

Adamic et al., "A Social Network Caught in the Web," at http://firstmonday.org/issues/issue8_6/adamic, as available via the Internet and printed on Jul. 28, 2004.

Amazon.com, "Selling at Amazon Marketplace," at http://pages.amazon.com/exec/obidos/tg/browse/-/1161234/ref=hp_hp_is_4_2/002-283572 as available via the Internet and printed on Jul. 29, 2004.

Amazon.com, "New Seller FAQ," at http://pages.amazon.com/exec/obidos/tg/browse/- /1161274/002-2835726-5513622 as available via the Internet and printed on Jul. 29, 2004.

Azran, "The Rendezvous Algorithm: Multiclass Semi-Supervised Learning with Markov Random Walks," *ICML*, 2007, 8 pages.

Dalal and Triggs, "Histograms of Oriented Gradients for Human Detection," *Proc IEEE Conf Computer Vision and Pattern Recognition*, Jun. 2005, pp. 886-893.

Dellaert et al., "Mixture Trees for Modeling and Fast Conditional Sampling with Applications in Vision and Graphics," *Proc IEEE Conf Computer Vision and Pattern Recognition*, 2005 at http://www.cs.unc.edu/~kwatra/publications/cvpr05-mixtree.pdf.

Doctorow, "Running Notes from Revenge of the User: Lessons from Creator/User Battles," at http://craphound.com/danahetcon04.txt, as available via the Internet and printed Jul. 28, 2004.

Ebay.com, "What is eBay?" at http://pages.ebay.com/help/welcome/questions/about-ebay.html as available via the Internet and printed on Jul. 29, 2004.

Ebay.com, "How to Bid," at http://pages.ebay.com/help/welcome/bid.html as available via the Internet and printed on Jul. 29, 2004.

Ebay.com, "How to Sell," at http://pages.ebay.com/help/welcome/sell.html as available via the Internet and printed on Jul. 29, 2004.

Gibson et al., "Inferring Web Communities from Link Topology," *Proc 9$^{th}$ ACM Conference on Hypertex and Hypermedia*, 1998, 10 pages.

Gionis et al., "Similarity Search in High Dimensions via Hashing," *Proc 25$^{th}$ Very Large Database Conf*, 1999 at people.csail.mit.edu/indyk/vldb99.ps.

Glance et al., "Knowledge Pump: Supporting the Flow and Use of Knowledge," *Information Technology for Knowledge Management*, 1997, Borghoff and Pareschi (eds.), Springer Verlag, 22 pages.

Grauman and Darrell, "The Pyramid Match Kernel: Discriminative Classification with Sets of Image Features," *ICCV 2005* at http://people.csail.mit.edu/kgrauman/jobapp/kgrauman_sample_papers.pdf.

Indyk, "Stable Distributions, Pseudorandom Generators, Embeddings, and Data Stream Computation," *Proc. 41$^{st}$ IEEE Symposium on Foundations of Computer Science (FOCS)*, pp. 189-197, 2000.

Jeh and Widom, "SimRank: A Measure of Structural-Context Similarity," *Proc 8th ACM SIGKDD international conference on knowledge discovery and data mining*, Jul. 2002, pp. 538-543.

Jing and Baluja, "VisualRank: Applying PageRank to Large-Scale Image Search," *IEEE Transaction on Pattern Analysis and Machine Intelligence*, 2008, 30(11):1877-1890.

Joachims, "Text Categorization with Support Vector Machines: Learning with Many Relevant Features," *Proc 10th European Conf on Machine Learning*, 1998, pp. 137-142.

Kautz et al., "ReferralWeb: Combining Social Networks and Collaborative Filtering," *Communications of the ACM*, 1997, 40(3):1-4.

Leigh et al., "Transformation, Ranking, and Clustering for Face Recognition Algorithm Comparison," at http://www.itl.nist.gov/div898/itperf/renorm.pdf (617001 invention disclosure).

Liew et al., "Social Networks," U.S. Appl. No. 60/552,718, filed Mar. 15, 2004, 9 pages.

Liu et al., "An Investigation of Practical Approximate Nearest Neighbor Algorithms," *Proc Neural Information Processing Systems*, 2004 at http://www.cs.cmu.edu/~tingliu/research.htm.

Lowe, "Local Feature View Clustering for 3D Object Recognition," *CVPR 2001*, at http://www.cs.ubc.ca/~lowe/papers/cvpr01.pdf.

Microsoft Corporation, "Is Friendster the 'Next Big Thing'?" at http://mobilemomentum.msn.com/article.aspx?aid=4, as available via the Internet and printed on Jul. 29, 2004.

Monay and Gatica-Perez, "On Image Auto-Annotation with Latent Space Models," *MM'03*, Nov. 2-8, 2003.

Multiply, "About Multiply," at http://multiply.com/info/about, as available via the Internet and printed on May 3, 2004.

Multiply, "Help," at http://multiply.com/info/help, as available via the Internet and printed on May 3, 2004.

Multiply, "Multiply Privacy Policy," at http://multiply.com/info/privacy, as available via the Internet and printed on May 3, 2004.

Multiply, "Multiply Terms of Service," at http://multiply.com/info/tos, as available via the Internet and printed on May 3, 2004.

Roach et al., "Video Genre Classification Using Dynamics," 2001, *Proc Acoustics, Speech, and Signal Processing on IEEE Intl Conference*, pp. 1557-1560.

Rothganger et al., "3D Object Modeling and Recognition Using Affine-Invariant Patches and Multi-View Spatial Constraints," *CVPR 2003*, at http://vasc.ri.cmu.edu/~hebert/04/AP/fred_cvpr03.pdf.

Rowley et al., "Neural Network-Based Face Detection," *IEEE Transactions on Pattern Analysis and Machine Intelligence*, 1998, 20(1).

Szummer and Jaakkola, "Partially labeled classification with Markov random walks," *NIPS 2001*.

Tribe.net, "Listings Directory," at http://www.tribe/servlet/template/pub.Listings.vm, as available via the Internet and printed on Jun. 28, 2004.

Viola and Jones, "Robust Real Time Face Detection," *Int J Computer Vision*, 2004 at http://scholar.google.com/scholar?hl=en&lr=&cluster=10098362814192689387.

Wang et al., "AnnoSearch: Image Auto-Annotation by Search," *CVPR 2006*.

Yang and Pedersen, "A Comparative Study on Feature Selection in Text Categorization Source," *Proc 14th Intl Conf Machine Learning*, 1997, pp. 412-420.

Zhou and Schölkopf, "Learning from Labeled and Unlabeled Data Using Random Walks," *Lecture notes in computer science*, 2004, Springer, 8 pages.

Zhu et al., "Semi-Supervised Learning Using Gaussian Fields and Harmonic Functions," *Proc. 20th Intl Conf on Machine Learning*, 2003, 8 pages.

Zhu, "Semi-Supervised Learning with Graphs," 2005, Doctoral Thesis, Carnegie Mellon University, 174 pages.

\* cited by examiner

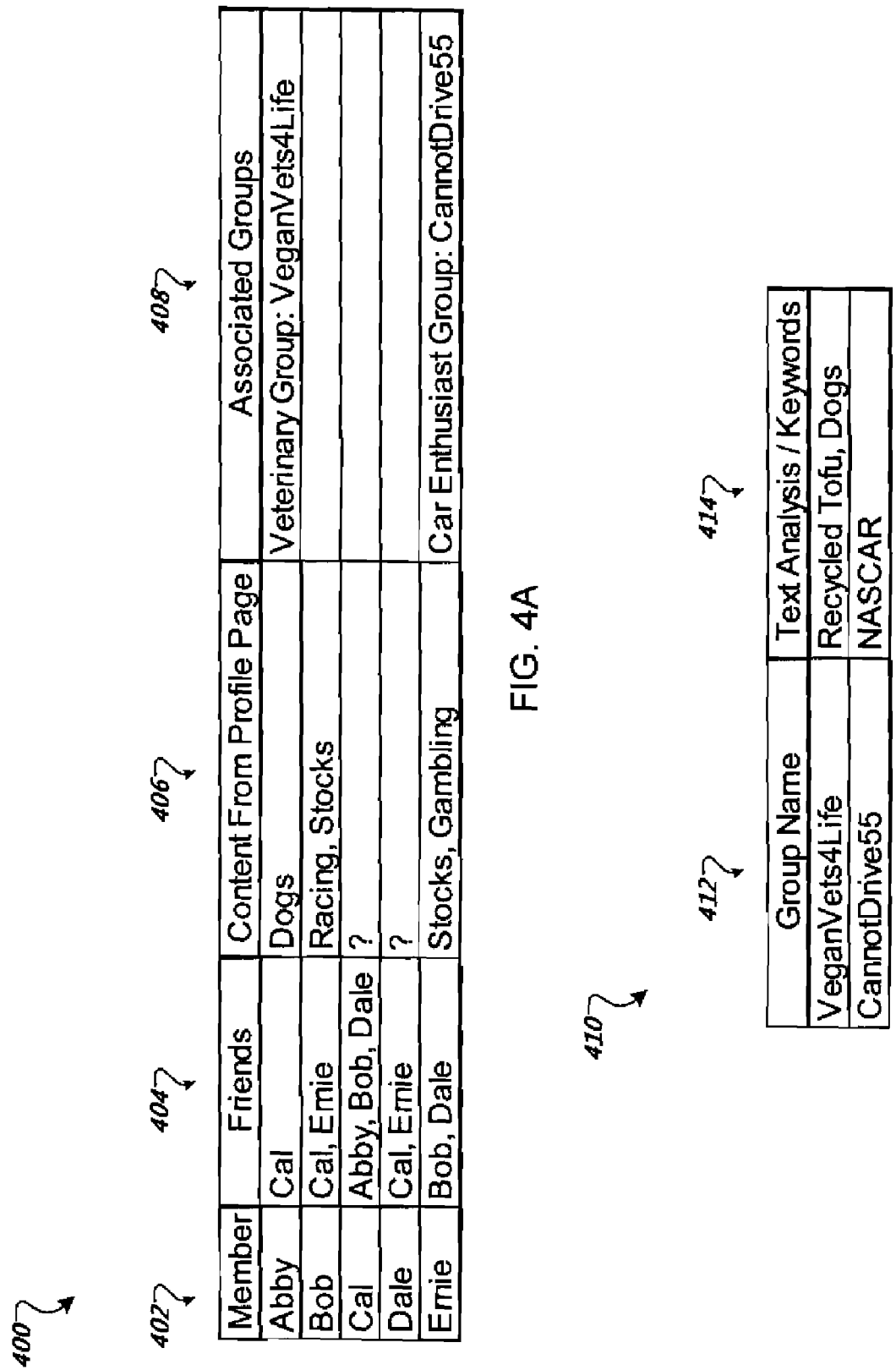

INFERRING USER INTERESTS

TECHNICAL FIELD

This instant specification relates to inferring interests of a user.

BACKGROUND

Social networks can permit users to post information about themselves and communicate with other people, such as their friends, family, and co-workers. Some social networks permit users to specify friendships with other users. Additionally, social network users may write descriptions of their interests, compose stories, describe their lives, etc. Some user may generate a great amount of content, while other users may generate very little.

SUMMARY

In general, this document describes inferring user interests.

In a first general aspect, a computer-implemented method is described. The method includes determining, for a portion of users of a social network, label values each comprising an inferred interest level of a user in a subject indicated by a label, associating a first user with one or more second users based on one or more relationships specified by the first user, and outputting a first label value for the first user based on one or more second label values of the one or more second users.

In a second general aspect, a computer-implemented method is described, which includes generating a data structure that represents users of a social network as user nodes linked based on social relationships specified by the users. The method also includes associating, with a portion of the user nodes, one or more label values that characterize a user's interest based on information about the user received from the social network system and outputting, for user nodes that lack adequate information about the corresponding users to determine a label value, label values based on neighboring label values associated with neighboring user nodes that are linked to the user nodes that lack the adequate information.

In another general aspect, a system for inferring user interests is described. The system includes a classifying module for determining, for a portion of users of a social network, label values each comprising an inferred interest level of a user in a subject indicated by a label. The system also includes means for associating a first user with one or more second users based on one or more relationships specified by the first user and an interface for outputting a first label value for the first user based on one or more second label values of the one or more second users.

The systems and techniques described here may provide one or more of the following advantages. First, social network users can be targeted (e.g., for advertising purposes) regardless of whether the users have generated an adequate user profile. Second, user interests can be inferred based on interests of the users' friends that are also members of the social network. Third, users' interests can be inferred based group membership and information about the group. Fourth, the influence of a friend's interests can be adjusted based on the type and degree of relationship between the user and the friend.

The details of one or more embodiments are set forth in the accompanying drawings and the description below. Other features and advantages will be apparent from the description and drawings, and from the claims.

DESCRIPTION OF DRAWINGS

FIGS. 4A-4D show exemplary information used for labeling users and groups of users.

Like reference symbols in the various drawings indicate like elements.

DETAILED DESCRIPTION

Figure 1:
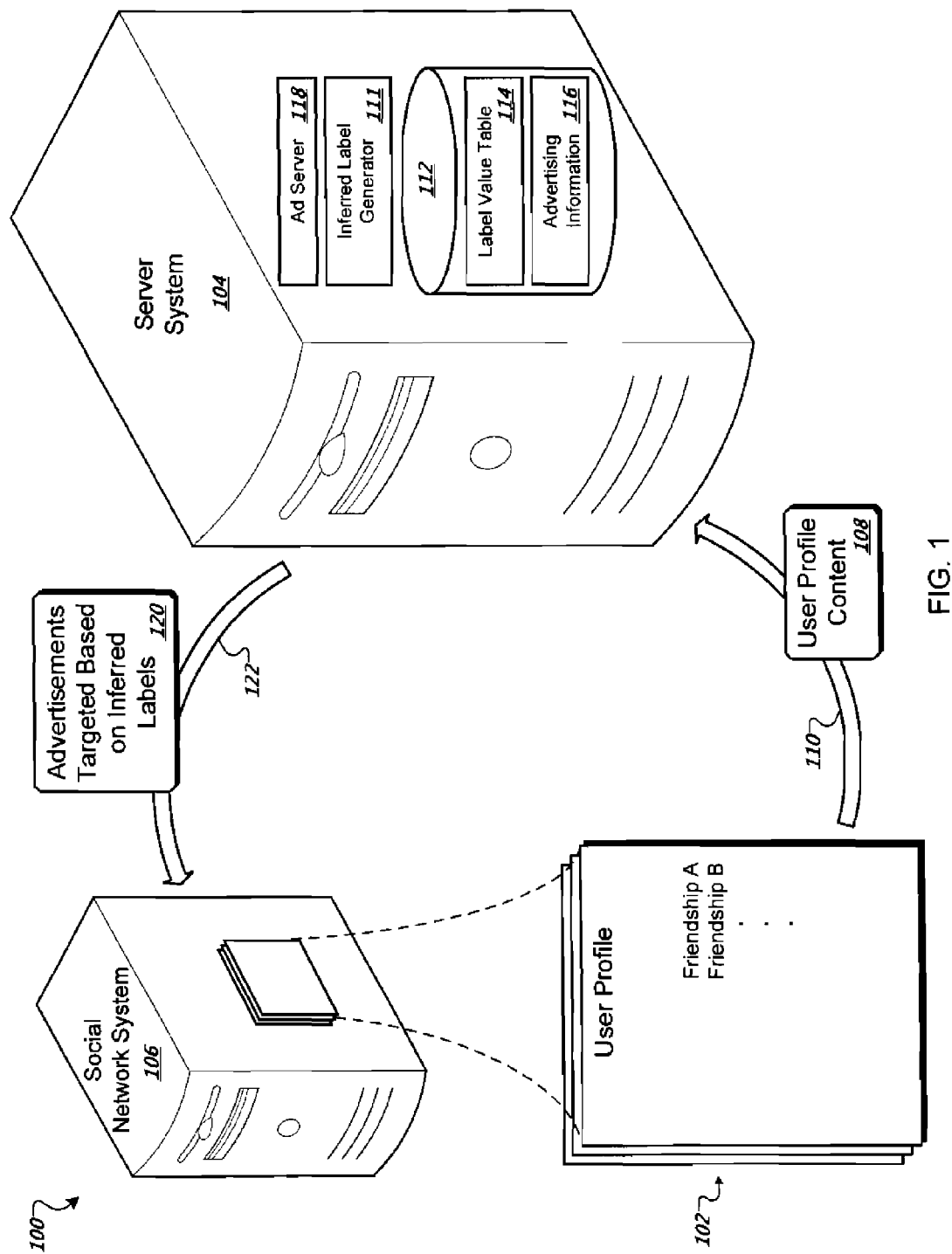
FIG. 1 is a schematic of an exemplary system for inferring information for a first social network user based on information of another user that is socially related to the first social network user.

This document describes systems and techniques for inferring users' interests. Social networks can host information about and generated by the social network's users. For example, as seen in FIG. 1, users can create profiles 102, which can include interests, stories, facts, or descriptions about a user. Additionally, the users can specify social relationships with other users. For example, a user can specify other users that are "friends."

Advertising systems, such as server system 104 of FIG. 1, can target online advertisements (ads) to person who view the user profiles hosted on the social network. In certain implementations, the advertising system generates the online ads based on the content of the profiles. In some situations, a user may not provide enough (or any) information in his profile, which may make it difficult to generate online ads that are accurately targeted for the profile.

In the situation where a first user lacks information in his profile, profiles of other users that are related to the first user can be used to generate online ads for display with the first user's profile. For example, a first user Isaac may not have any information in his profile except that he has two friends—Jacob and Esau. The server system 104 can use information from Jacob and Esau's profiles to infer information for Isaac's profile. The inferred information can be used to generate online ads that are displayed when Isaac's profile is viewed.

In other situations, profiles for social network users may include terms or colloquialisms that do not correspond to keywords that advertisers use to target their campaigns. These terms or colloquialisms can be mapped to keywords that are used by advertisers by inferring associations between the terms or colloquialisms (collectively referred to as non-advertising keywords) and the keywords.

In some implementations, the inferred associations between the non-advertising keywords and the advertising keywords are based on social relationships specified in user profiles. For example, Jacob may include terms in his profile, such as "hax0r" (i.e., hacker) and "btcn" (i.e., better than Chuck Norris) that do not correspond to advertising keywords. Jacob's profile specifies that Leah and Rachel are friends. Both Leah and Rachel include terms in their profile, such as "Ajax" (i.e., asynchronous JavaScript and XML) and Perl (Practical Extraction and Reporting Language) that do correspond to advertising keywords. An advertising system, such as the server system 104, can be used to generate associations between Leah and Rachel's terms and Jacob's terms so that advertisements targeted for Leah and Rachel based on the keywords in their profile can also be used to target ads for Jacob because an association is inferred between Jacob's profile and terms in Leah and Rachel's profiles.

FIG. 1 is a schematic of an exemplary system 100 for inferring information for a first social network user based on information of another user that is socially related to the first social network user. In some implementations, the system includes a social network system 106 and the server system discussed previously, which can determine associations between content in individual users' profiles based on social relationships specified by the profiles.

In some implementations, the social network system 106 includes the user profiles 102, which can include user generated content, such as user interests, user blogs, postings by the user on her or other users' profiles (e.g., comments in a commentary section of a web page), a user's selection of hosted audio, images, and other files, and demographic information about the user, such as age, gender, address, etc.

Additionally, the profiles 102 can include social relationships that specify associations between users of the social network system 106. For example, a user Joshua may list Aaron and Caleb as friends and may be a member of the Trumpet Player Society, which includes Izzy as a second member. The specified friendship and group membership relationships can be used to infer a similarity in user interests between the users Joshua, Aaron, Caleb, and Izzy.

Information, or content 108, of the profiles 102 can be transmitted to the server system 104, as indicated by an arrow 110. The server system 104 can use an inferred label generator 111 to create labels for incomplete or sparsely populated user profiles based on content of related user profiles (e.g., profiles of friends or members of the same group, clubs, society, etc.).

In some implementations, the labels can include keywords associated with the profiles. For example, a label may be a keyword, such as cars, that is included in a web page profile. In other implementations, the labels may be categories associated with content in a profile, for example, a profile can include content describing Corvettes, Vipers, and Hugos. A label applied to the profile may be "cars" based on predetermined associations between the Corvette, Viper, and Hugo terms and the category "cars."

In the implementation of FIG. 1, the server system 104 includes a data store 112, where information about the labels can be stored. In some implementations, each user profile may be associated with more than one label. The associations between each profile and corresponding labels can be stored in a data structure, such as a label value table 114.

In some implementations, the label value table 114 can also include label values that indicate a possible interest level for each label. For example, Adam's profile can include content about gardening and animal husbandry, but twice as much content may be focused on gardening. The label value table 114 can include a label value of 0.66 for gardening and 0.33 for animal husbandry under Adam's profile entry, which indicates the profile includes twice as much information on gardening as animal husbandry.

The data store 112 can also include advertising information 116 used to generate online advertisements (ads) 120 directed to profiles hosted by the social network system 106. The online advertisements 120 can be transmitted by an ad server 118 hosted by the server system 104. The ad server 118 can use the label information in the label value table 114 to generate online ads 120 that are targeted for user profiles based on labels associated with the user profiles. The server system 104 can transmit, as indicated by arrow 122, the target ads 120 to the social network system 106 for display with the user profiles or to the user's associated with the user profiles.

Figure 2:
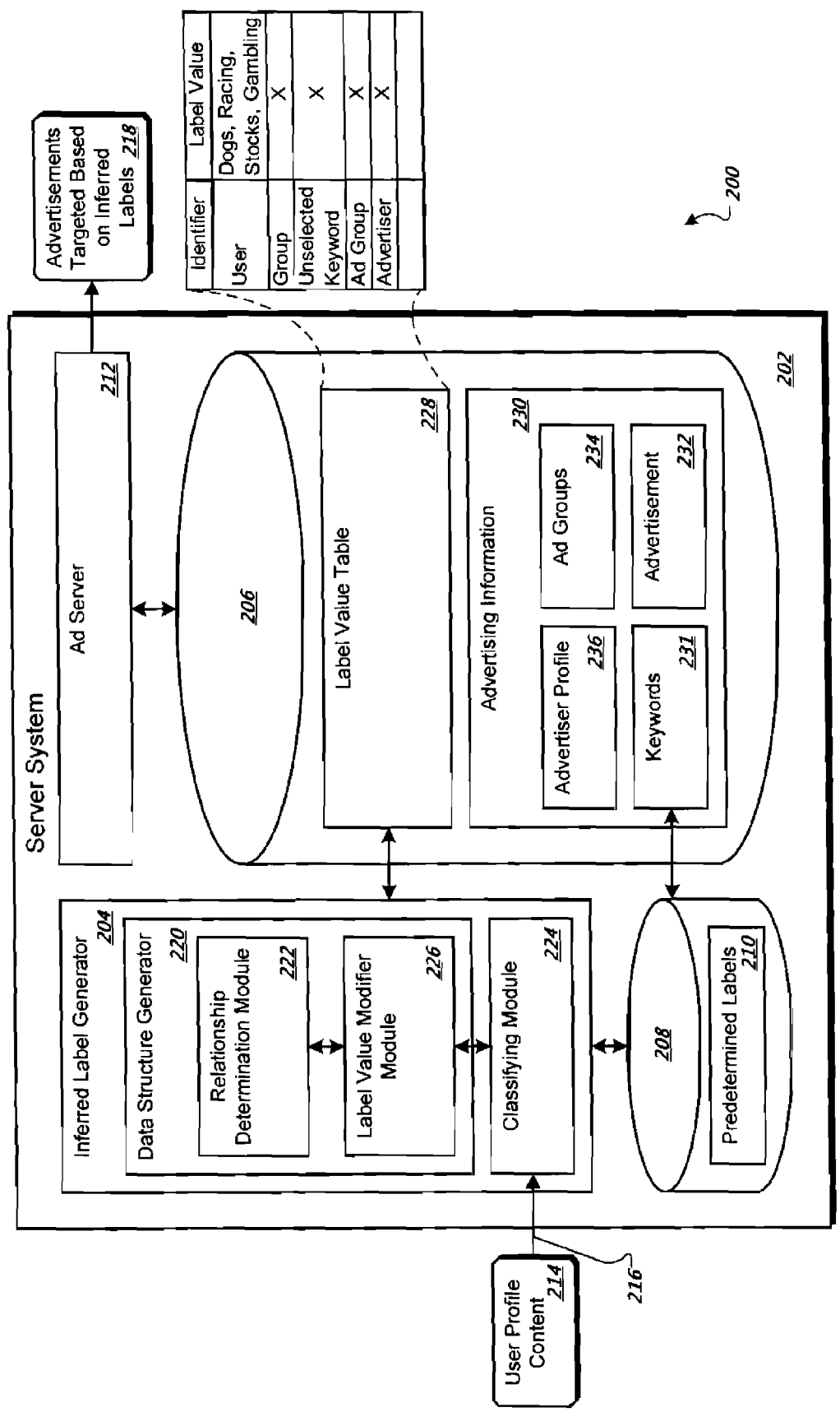
FIG. 2 is a box diagram of an exemplary system that shows a server system and infers labels for user profiles hosted by a social network system.

FIG. 2 is a box diagram of an exemplary system 200 that shows a server system 202 and infers labels for user profiles hosted by a social network system. The server system 202 includes an inferred label generator 204, a first data store 206 that includes label and ad information, a second data store 208 that includes predetermined labels 210, and an advertising server 212.

In some implementations, the server system 202 can receive content 214 of user profiles from a social network system, as indicated by arrow 216. The server system can use the content 214 to identify or generate a labels based on the content 214, where the labels can be used to generate or identify online ads 218 that are targeted to corresponding users or user profiles.

In some implementations, the inferred label generator 204 includes a data structure generator 220 to create a data structure used to infer the labels. For example, the data structure generator can generate a graph, where each user (or user profile) is represented with a node. The data structure generator 220 can include a relationship determination module 222 that links the nodes with edges based on social relationships specified by the user. For example, a user Adam may specify in his profile that Seth is a friend. The relationship determination module 222 can join the user nodes for Adam and Seth with an edge. The edges may be bi-directional or uni-directional, however for the purposes of clarity, the edges in the following examples, are bi-directional unless otherwise specified.

The inferred label generator 204 also includes a classification module 224, which can associate users of the social network system with labels, such as the predetermined labels 210 in the second data store 208. For example, the classification module can use text analysis techniques, such as those described in "A Comparative Study on Feature Selection in Text Categorization Source," Yang, Yiming and Pedersen, Jan O., Proceedings of the Fourteenth International Conference on Machine Learning, pages 412-420; "Machine learning in automated text categorization," Sebastiani, Fabrizio, ACM Computing Surveys (CSUR) archive, Volume 34, Issue 1 (March 2002), pages 1-47; and "Text Categorization with Support Vector Machines: Learning with Many Relevant Features," Joachims, Thorsten, Lecture Notes In Computer Science, Vol. 1398 archive, Proceedings of the 10th European Conference on Machine Learning, pages: 137-142; the entirety of each is incorporated by reference here. Text analysis can be used to determine labels to association with user nodes in a generated graph. The subject of the analysis can include user profiles, comments posted by a user, descriptions of groups to which a user belongs, etc. In other implementations, the predetermined labels 210 can be based on keywords 231, which are submitted by advertisers. For example, the keywords 231 can include the term "furniture." This can be used as a predetermined label, which the classifying module 224 associates with users that have profiles that include the term "furniture." Additionally, the classifying module can associate the users with the label "furniture" if the user profiles include words that are associated with "furniture," such as chair, table, or home decorating.

In some implementations, the inferred label generator 220 also includes a label value modifier module 226. The label value modifier module 226 can modify label values associated with users (and label values associate with groups of users, advertiser-selected keywords, groups of keywords, advertisers, and keywords not selected by advertisers) using methods and structures more fully described below.

Initial and modified label values can, in some implementations, be stored in a data structure, such as a label value table 228 of the first data store 206. As shown in FIG. 2, the label value table 228 can include an index that associates label values with each of the following: users, groups of users, keywords not selected by advertisers, and groups of keywords selected by an advertiser.

The advertising server 212 can use advertising information stored in the first data store to generate or select an electronic advertisement that is based on the label or label values associated with each user. The advertising information can include, for example, keywords 231 that an advertiser selected to associate with their advertisement. The advertising information can also specify advertising word groups 234 (also referred to as Adgroups), which are categories that include related keywords and are associated with ads to display when one of the keywords occurs, for example, in a user's profile. Additionally, the advertising information 230 can include information 236 about the advertisers, such as an identifier, payment information, bidding price for ads, etc.

Figure 3:
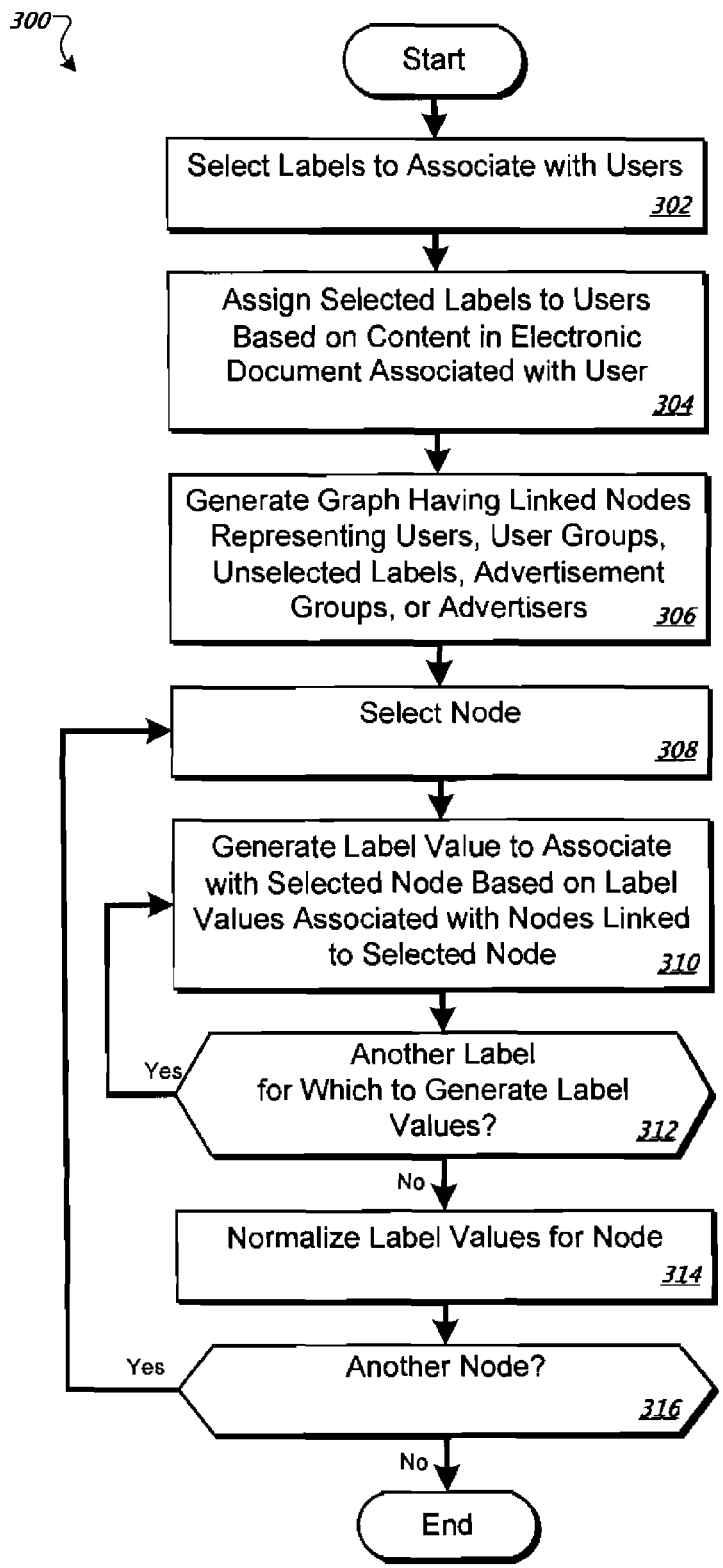
FIG. 3 is an exemplary method for generating inferred labels.

FIG. 3 is an exemplary method 300 for generating inferred labels. In one implementation, the method 300 includes steps that can be implemented as instructions and executed by a processor in the server system 202.

The method 300 can begin with step 302, where labels are selected to associate with users. For example, labels can include both categories of interest (e.g., music, movies, business, etc.) and keywords ("Britney Spears," "tables," "masks," etc.). In some implementations, either categories or keywords are selected as labels. Also, a subset of categories or keywords can be selected from the superset to use as labels. For example, a user may input a selection of particular keywords to the inferred label generator 204, where the selection specifies that the inferred label generator 204 should use the categories "Racing," "Stocks," "music," "politics," and "religion" as keywords.

In step 304, labels selected in step 203 are assigned to users based on content of electronic documents associated with the users. For example, the classifying module 224 can classify each user based on their user profile or other content that the user has created. The classifying module 224 can use text-classification machine learning algorithms to accomplish the classifications. In certain implementations, a user can be classified using more than one label. Additionally, in some implementations, if a user's profile does not have enough information to classify, the user is left unclassified.

Although not shown in method 300, in some implementations, if the social network system includes any user groups, such as clubs, societies, classes, etc., the classifying module 224 can attempt to categorize the groups based on text and other content that describes the group or is associated with the group, such as message boards for the group. The classifying module can classify the groups in a substantially similar way as the user classification is accomplished.

In step 306, a data structure, such as a graph, is generated. For example, the data structure generator 220 can represent each user, user group, unselected keywords or categories, advertising groups, and advertisers as a node in the graph. The relationship determination module 222 can link the nodes based on social and other relationships specified by the nodes. For example, the relationship determination module 222 can link two user nodes together if the users specified each other as "friends" on their user profiles. In another example, an advertiser node can be linked to an advertising group that includes keywords that were specified by the advertiser.

In some implementations, label nodes having multiple label values for different labels are also associated with user nodes. These label nodes "inject" label values into the user node (e.g., see FIG. 6A). This is described in more detail in association with the FIGS. 4-13.

Additionally, in some implementations, the inferred label generator 204 generates a second data structure, such as a second graph. The second graph can also include nodes substantially similar to the first graph, except that each user can be associated with one or more label nodes that express a single subject of interest (e.g., see FIG. 7).

In step 308, a user is selected. For example, the inferred label generator 204 can select a user node representing a user in a graph. The inferred label generator 204 can access neighboring user nodes that are linked to the selected user node (e.g., the user's friends) and use their label values to generate a new or modified label value for the selected user, as indicated in step 310.

If the selected user has additional labels that have not been assigned new or modified label values, the inferred label generator selects the additional label and repeats step 310 until all the labels are processed, as indicated by step 312.

In step 314, the label values for the user are normalized. For example, the inferred label generator 204 can normalize the label values to a figure between a 0 and 1, where the figure expresses the label value's contribution relative to the other label values' contributions. For example, if the pre-normalized label values are Stocks=2.0, Racing=1.0, and Gambling=1.0, then the normalized values would be Stocks=0.5, Racing=0.25, and Gambling=0.25.

If there are additional users that have not been selected using the method 300, the next unselected user can be selected as illustrated by step 316. For example, the inferred label generator 204 can select the next unselected user node. If all the users have been selected, the method 300 can end.

In some implementations, steps 308-316 can also be performed on the second graph described in association with step 306. The inferred label generator 204 can select and compare the resulting label value magnitudes for a corresponding user node from both the first and second graphs. In some implementations, the inferred label generator 204 can combine the label value magnitudes from each graph through linear weighting to determine a final label value magnitude (e.g., the first graph's label value contributes 0.7 and the second graph's label value contributes 0.3). In other implementations, the values can be weighed equally to determine the final label value (e.g., 0.5, 0.5), or the inferred label generator 204 can give one value its full contribution while ignoring the value from the other graph (e.g., [1.0,0.0] or [0.0,1.0]).

In other implementations, the inferred label generator can use a cross-validation method to set the contribution weights for label value magnitudes from each graph. For example, the inferred label generator 204 can access user nodes in a graph, where the user nodes have label value magnitudes that are know. The inferred label generator 204 can compare the actual label value magnitudes with the known label value magnitudes. The inferred label generator 204 can then weight each graph based on how closely its values match the known label values.

In certain implementations, the label generator 204 can compare the label value magnitudes to an expected a priori distribution, instead of or in addition to examining the final label magnitudes. For example, if a summed weight of label_A across all label nodes is 8.0 and the weight of label_B across all of the label nodes is 4.0, the a priori distribution suggests that label_A may be twice as likely to occur as label_B. The inferred label generator 204 can use this expectation to calibrate the label value magnitudes for each user node. If in node_n, Label_A weight is 1.5 and label_B weight is 1.0, then the evidence for label_A, although higher than label_B, is not as high as expected because the ratio is not as high as the a prior distribution. This decreases the confidence that the difference in magnitudes is meaningful. A confidence factor can be translated back into the rankings.

In some implementations, if the difference in magnitudes is below a confidence threshold, the inferred label generator 204 can rank a label with a lower weight above a label with a higher weight (e.g., manipulate the lower weight so that it is increased to a value greater than the higher weight). For example, if label_A's weight is expected to be three times the weight of label_B, but was only 1.1 times greater than label_B, the inferred label generator 204 can rank label_B above label_A. In some implementations, the confidence factor can be kept as a confidence measure, which can be used, for example, by machine learning algorithms to weight the resultant label value magnitudes.

In yet other implementations, instead of or in addition to comparing the label value magnitudes based on the a priori distribution of the label nodes, the inferred label generator 204 can compare the label value magnitudes based on an end distribution of magnitudes across all nodes. For example, the inferred label generator 204 can measure how different a particular node's distribution is from an average calculated across all nodes in a graph.

Given the labels generated by the inferred label generator 204, in some implementations, the ad server 212 can use the labels to select ads to display. For example, if a user node is associated with the label "Britney Spears," the ad server 212 can select music ads to display with a user profile associated with the user node. In another example, if the label is "religion," the ad server 212 can select ads that are determined to be religious or ads that an advertiser specified to be displayed based on an occurrence of terms relating to religion.

In yet other implementations, other factors can influence whether an ad is displayed based on the labels. For example, the ad server 212 can factor in how much an advertiser is willing to pay for display of the ad, such as the cost per impression/click/transaction/etc., to determine whether to display an advertisement and which advertisement to display.

FIGS. 4A and 4B show exemplary information used for labeling users and groups of users. An exemplary table 400 shown in FIG. 4A includes information about users of a social network. The exemplary table 400 has four columns, which include member identifiers 402, identifiers that specify a user's friends 404, initial labels generated based on content from a user's profile page 406, and identifiers that specify with which groups a user is associated 408.

FIG. 4B shows an exemplary table 410 that includes identifiers for groups in the social network system 412 and initial labels generated based on content that describes the groups 414, for example, content from the group's profile page on the social network. In certain implementations, the labels may be generated and stored in the table by the classifying module 224 using textual analysis techniques as described previously.

Figure 4C:
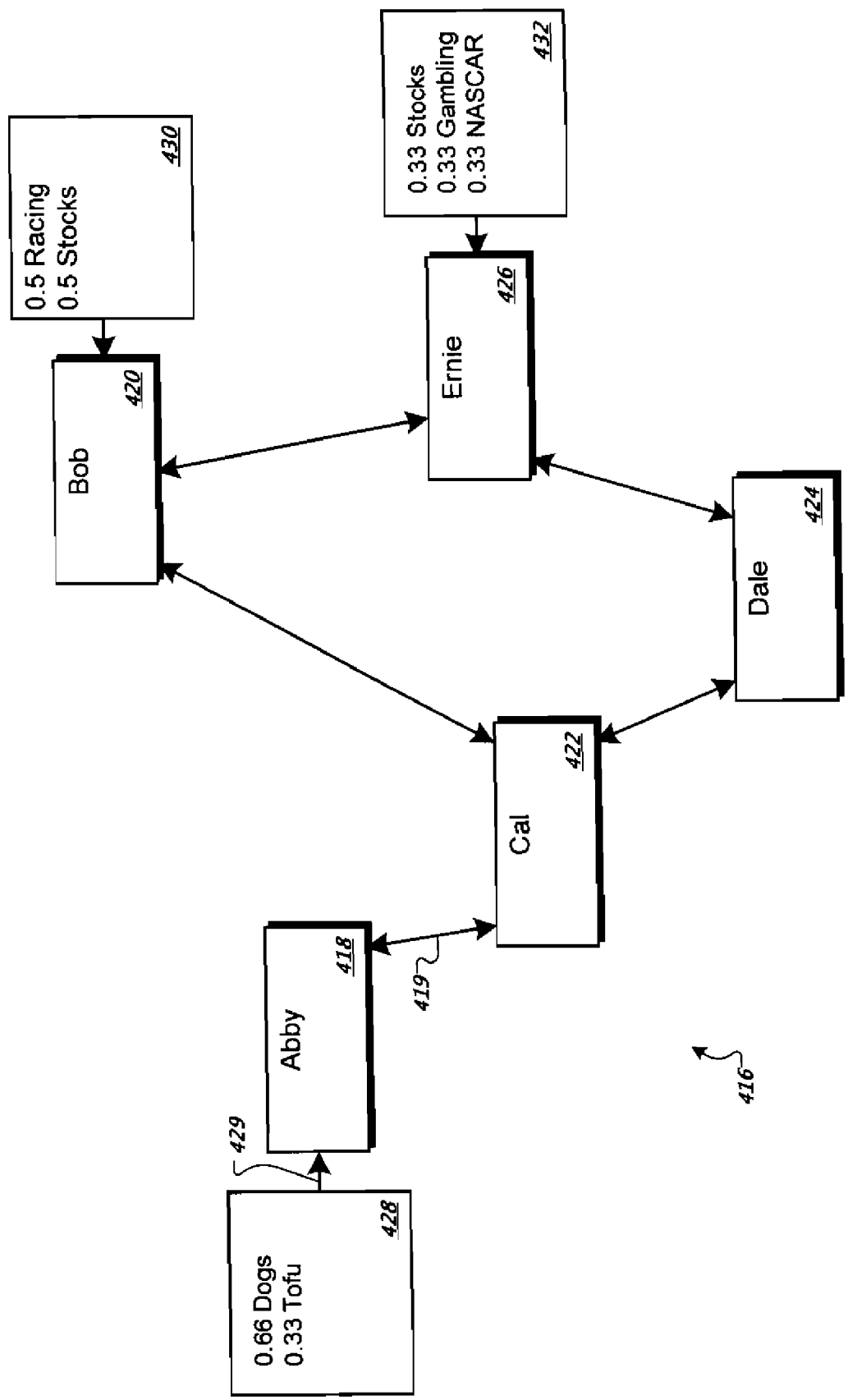

This information can also be represented by an exemplary graph data structure 416 as shown in FIG. 4C. Each of the users in a social network can be represented as nodes in the graph. For example, Abby, Bob, Cal, Dale, and Ernie, each are represented by nodes 418, 420, 422, 424, and 426, respectively. For simplicity of explanation, the graph data structure 416 does not explicitly show nodes associated with groups, such as the VeganVets4Life and CannotDrive55 included in the table of FIG. 4B. However, labels associated with the groups (e.g., Recycled Tofu, Dogs, and NASCAR) are associated with the members of the groups. This is described in more detail below.

In certain implementations, the user nodes are linked by edges based on social relationships specified by the users. For example, Abby node 418 is linked by edge 419 to Cal node 422 because Abby specified that Cal was a friend on her profile page. FIG. 4C also shows label nodes that associate user nodes with labels that express a probable interest of the user. In some implementations, the label node has label values that may not change based on the label values of neighboring nodes. This is illustrated in this figure by the uni-directional edge 429.

For example, Abby node 418 is associated with label node 428 having label values 0.66 for a label Dogs and 0.33 for a label Recycled Tofu (shorted to Tofu in FIG. 4C). In certain implementations, the labels have label values that express how much each label should contribute to the user node. The label Dogs specifies that Abby is interested in Dogs based on the content of Abby's profile page. The label value for Dogs is increased because Abby is a member of the group VeganVets4Life, which is also associated with the label Dogs. Because Abby is a member of VeganVets4Life, Abby node 418 is also associated with a label value for Recycled Tofu.

In this example, the label value for Dogs is twice the value for Recycled Tofu because Abby is associated with the Dogs label through two means (e.g., group membership in VeganVets4Life as well as the content of Abby's profile), whereas she is only associated with Recycled Tofu through one source (e.g., her group membership in VeganVets4Life).

Bob node 420 is associated with a label node 430, which specifies that Bob is equally interested in Racing and Stocks based on, for example, Bob's profile.

The label node 432 is associated with Ernie node 426 and specifies that Ernie is interested in Stocks, Gambling, and NASCAR. More specifically, the label values specify that Ernie is interested in all three equally. In this example, the Stocks and Gambling labels are derived from Ernie's profile and the NASCAR label is derived from Ernie's membership in the group CannotDrive55, as indicated by the table of FIG. 4A. In this example, the label values are normalized to a value between 0 and 1, where the contribution of the label is proportional to all the labels. Because Ernie is equally interested in Gambling, Stocks, and NASCAR, each is assigned a label value of 0.33.

Figure 4D:
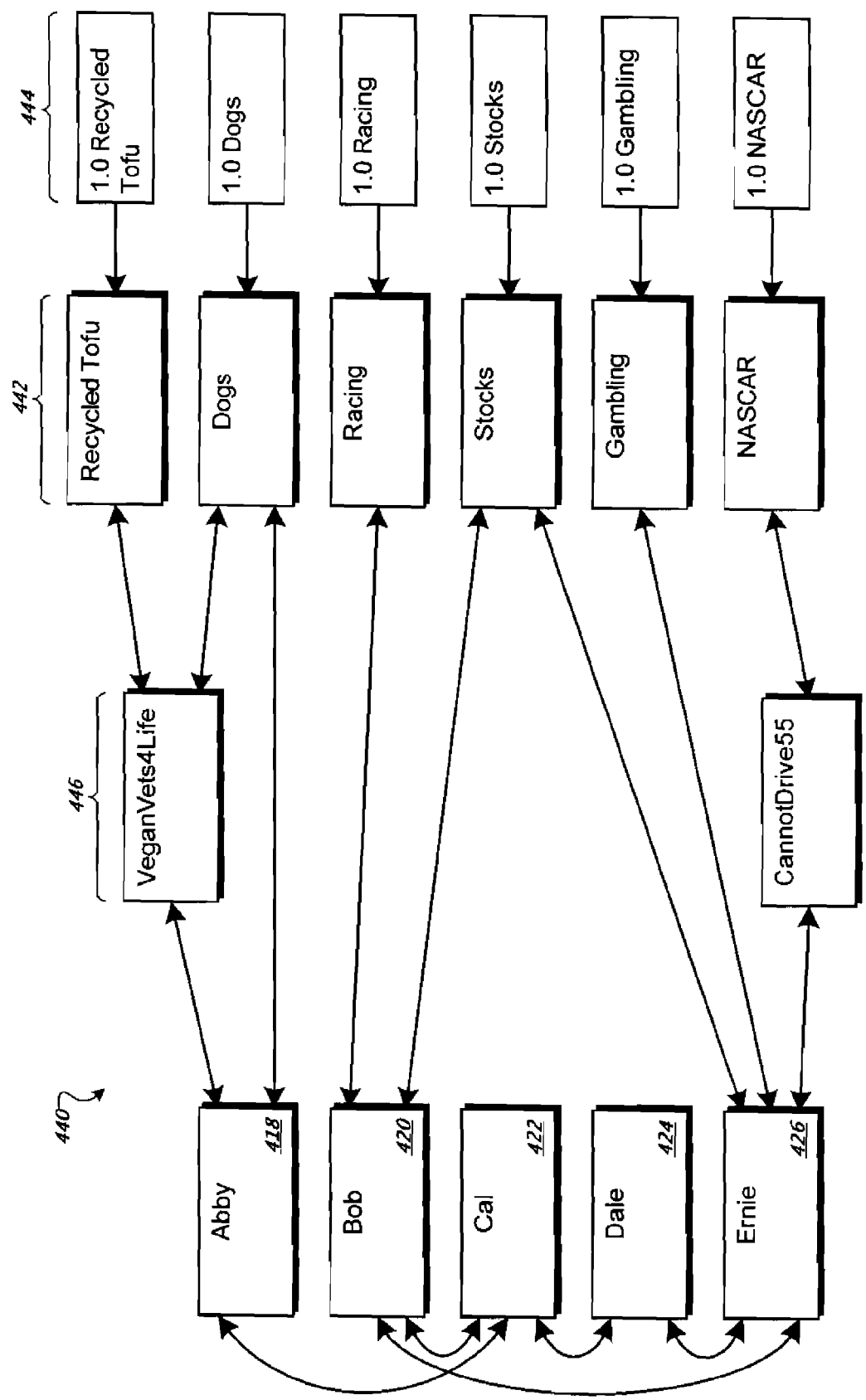

FIG. 4D shows another implementation of an exemplary graph data structure 440 for the information illustrated in FIGS. 4A and 4B. Here each user node is associated with a variable label node 442, which may include label values that can be modified based on label values of neighboring nodes. Here, the variable label nodes are also associated with "static" label nodes 444 that specify a single label value. As shown in FIG. 4D, the user nodes can be associated with more than one variable label node.

Additionally illustrated in FIG. 4C are group nodes 446 that are linked by edges to users based on user membership in the groups. The group nodes are linked to label nodes, where, for example, the classifying module 224 links the groups to the label nodes based on textual descriptions of the groups.

Figure 5:
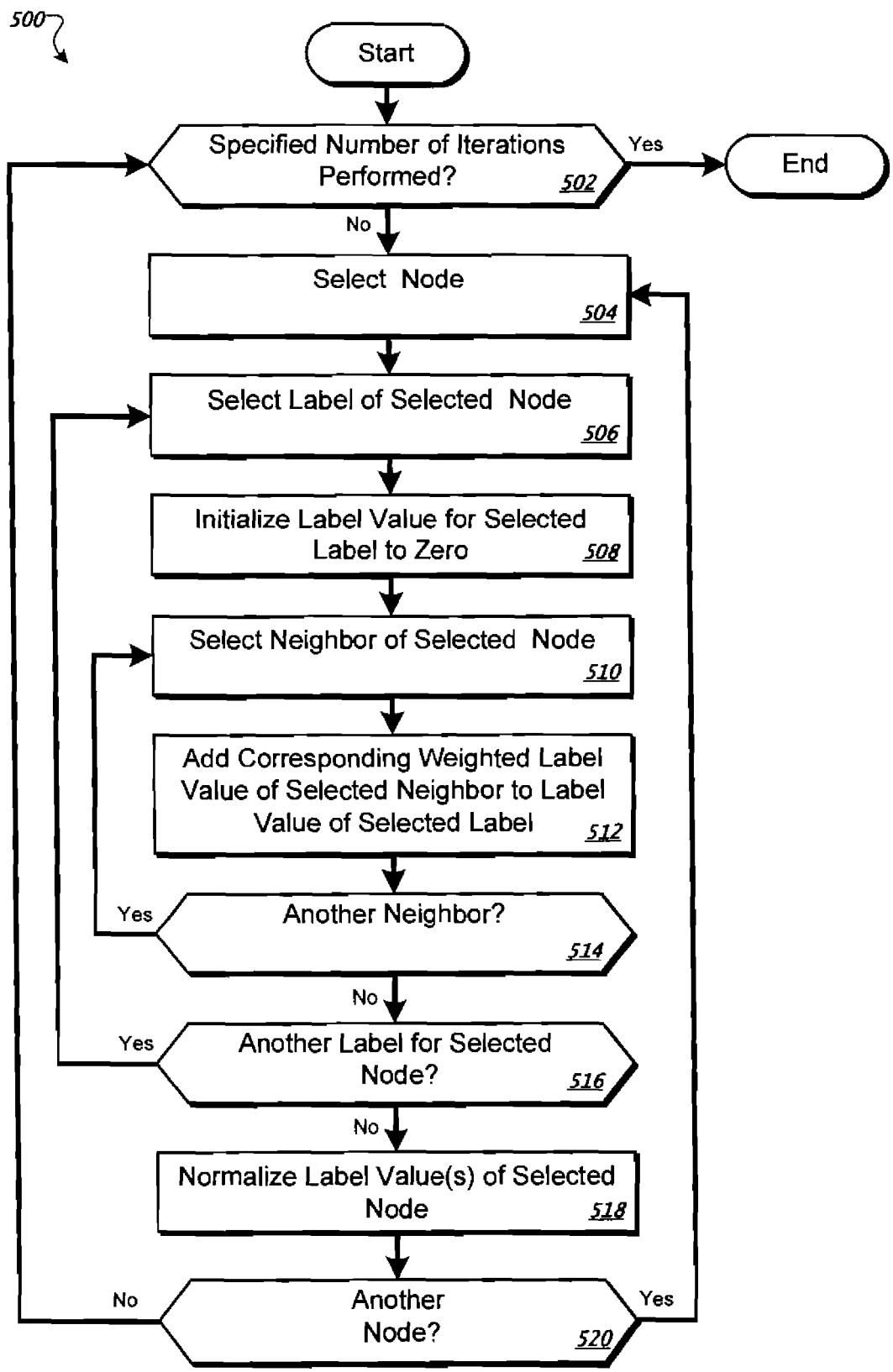
FIG. 5 shows an exemplary method for inferring labels based on a neighboring node's labels.

FIG. 5 shows an exemplary method 500 for inferring labels based on neighboring nodes' labels. In some implementations, the inferred label generator 111 or 220 can include instructions that are executed by a processor of the server system 104.

The method 500 can be executed using information from the graphs shown in FIGS. 4C and 4D and can be executed for every node in the graphs. The method 500 can start with step 502, which determines if a specified number of iterations have run for a graph. If the number is not complete, step 504 is performed. In step 504, a node is selected. For example, the inferred label generator 220 can select a node that has label values that may be modified by the algorithm, such as user nodes, variable label nodes, group nodes, etc.

In step 506, a label is selected from the selected node. For example, the inferred label generator 220 can select the label "Stocks" if present in the selected node. In step 508, a label value for the selected label is initialized to zero. For example, the inferred label generator 220 can set the label value for "Stocks" to zero.

In step 510, a neighboring node of the selected node can be selected. For example, the selected node may specify that Abby is a friend. The inferred label generator 220 can select a neighboring user node representing Abby.

In step 512, a corresponding weighted label value of a selected neighbor is added to a label value of the selected label. For example, if Abby has a label value for the label "Stocks," the inferred label generator 220 can add this value to the selected node's label value for "Stocks." In certain implementations, the label value retrieved from a neighboring node can be weighted to affect the contribution of the label value based on the degree of distance from the selected node (e.g., based on whether the neighboring node is linked directly to the selected node, linked by two edges to the selected node, etc.) In some implementations, the label value can also be based on a weight associated with the edge. For example, the edge weight can reflect an explicit association between two nodes. For instance, a first node may specify that the associated user likes a friend Jack (where the value associated with liking Jack is 0.8), that the user likes friend Jill half as much as Jack, etc.

In other implementations, the contribution can be weighted based on whether a link to a neighboring node is bidirectional (e.g., the neighboring node also specifies the selected node as a friend).

In step 514, it is determined whether there is another neighbor node to select. For example, the inferred label generator 220 can determine if the selected node is linked by a single edge to any additional neighbors that have not been selected. In another example, a user may specify how many degrees out (e.g., linked by two edges, three edges, etc.) the inferred label generator should search for neighbors. If there is another neighbor that has not been selected, steps 510 and 512 can be repeated, as indicated by step 514. If there is not another neighbor, step 516 can be performed.

In step 516, it is determined whether there is another label in the selected node. For example, the selected node can have multiple labels, such as "business," "Dogs," as well as the "Stocks" label. If these additional labels have not been selected, the inferred label generator 220 can select one of the previously unselected labels and repeat steps 506-514. If all the labels in the node have been selected, the label values of the selected node can be normalized, as shown in step 518. For example, the inferred label generator 220 can normalize each label value so that it has a value between 0 and 1, where the label value's magnitude is proportional to its contribution relative to all the label values associated with that node.

In step 520, it can be determined whether there are additional nodes in the graph to select. If there are additional nodes, the method can return to step 504. If all the nodes in the graph have been selected, the method can return to step 502 to determine whether the specified number of iterations has been performed on the graph. If so, the method 500 can end.

In certain implementations, the method 500 can include the following pseudo code:

```
Set t = 0
For each node, n, in the graph, G:
    For each label, l:
        Initialize the label: n_{l,t} = 0.0;
For t = 1..x iterations:
    For each node used to label other nodes, n, in the graph, G:
        For each label, l:
            Initialize the label amount: n_{l,t+1} = n_{l,t}
    For each node to be labeled, n, in the graph, G:
        For each label, l:
            Initialize the label amount: n_{l,t+1} = 0.0;
    For each node, n, in the graph, G:
        For each node, m, that has an edge with weight W_{mn}, to n:
            For each label:
                n_{l,t+1} = n_{l,t+1} + (W_{mn}·m_{l,t})
        Normalize the weight of the labels at each n, so that the sum of the
        labels at each node = 1.0
```

In certain implementations, after "x" iterations, the inferred label generator can examine one or more of the nodes of the graph and probabilistically assign a label to each node based on the weights of the labels (e.g., a label with the maximum label value can be assigned to the node).

In some implementations, the number of the iterations is specified in advance. In other implementations, the algorithm terminates when the label values for the labels at each node reach a steady state (e.g., a state where the difference in the label value change between iterations is smaller than a specified epsilon).

In another alternative method, label values for user nodes can be inferred by executing a random walk algorithm on the graphs. More specifically, in some implementations, given a graph, G, the inferred label generator 204 can calculate label values, or label weights, for every node by starting a random walk from each node. The random walk algorithm can include reversing the direction of each edge in the graph if the edge is directed. If the edge is bi-directional, the edge can be left unchanged.

The inferred label generator 204 can select a node of interest and start a random walk from that node to linked nodes. At each node where there are multiple-out nodes (e.g., nodes with links to multiple other nodes), the inferred label generator can randomly select an edge to follow. If the edges are weighted, the inferred label generator can select an edge based on the edge's weight (e.g., the greatest weighted edge can be selected first).

If during the random walk, a node is selected that is a labeling node (e.g., used as a label for other nodes), the classification for this walk is the label associated with the labeling node. The inferred label generator can maintain a tally of the labels associated with each classification.

If during the random walk, a node is selected that is not a labeling node, the inferred label generator selects the next random path, or edge, to follow.

The inferred label generator can repeat the random walk multiple times (e.g., 1000s to 100,000s of times) for each node of interest. After completion, the inferred label generator can derive the label values based on the tally of labels. This process can be repeated for each node of interest.

FIGS. 6A-6E show exemplary graphs of users in a social network, where an algorithm is used to infer label values for the users. In some implementations, the algorithm may include some or all of the steps of the method 500, the above pseudo code, or the described random walk algorithm. For simplicity, the graph only includes nodes representing users in the social network, however other entities may be represented in the graph as well, such as groups, advertisers, keywords, etc. This is described in more detail in association with later figures.

Figure 6A:
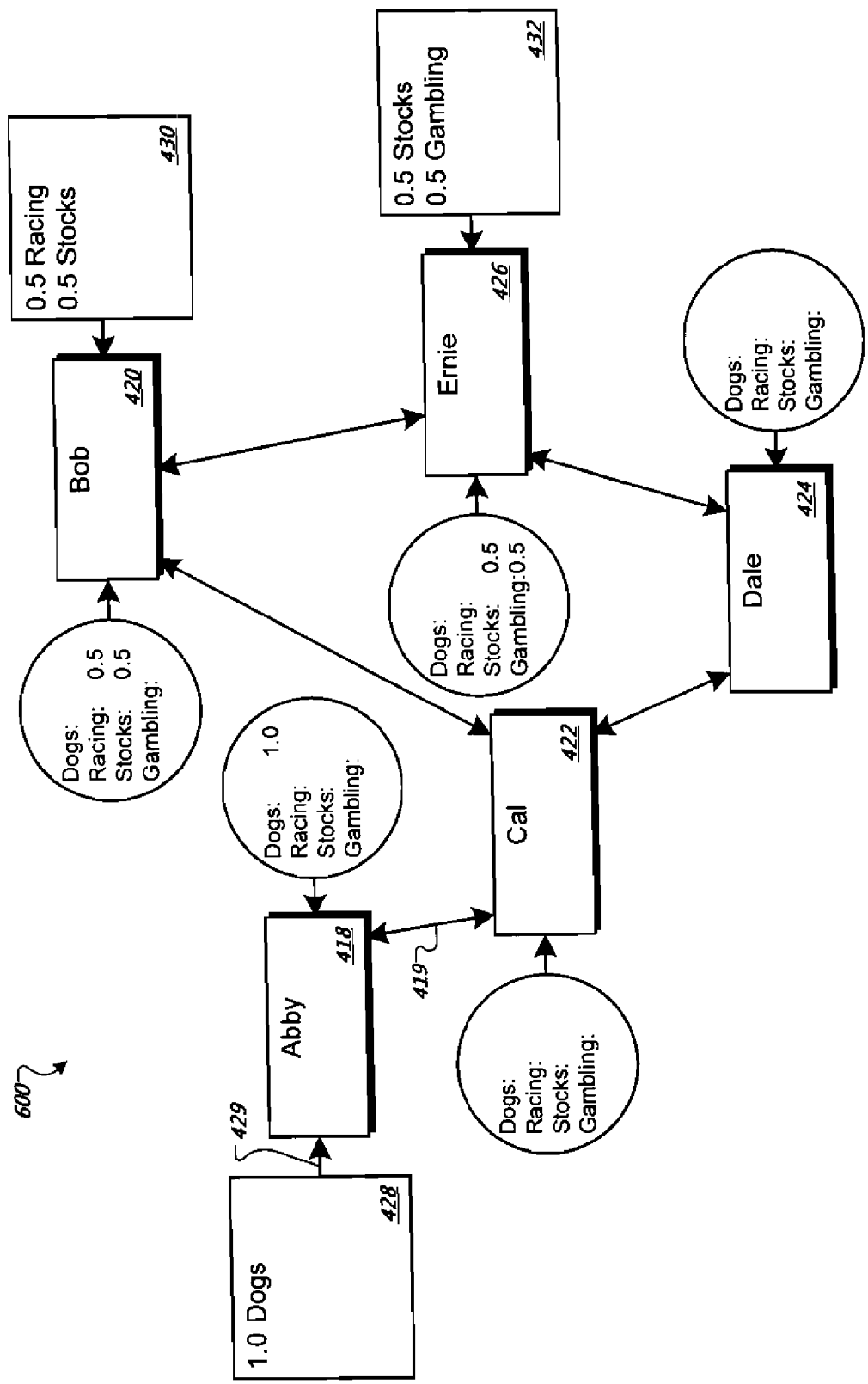
FIGS. 6A-6E show exemplary graphs of users in a social network, where an algorithm is used to infer label values for the users.

FIG. 6A shows a graph with five user nodes, each of which represents a user of a social network system. In some implementations, the classifying module 224 determines keywords to associate with each user node. For example, the keywords can be drawn from the users' profiles, from posts made by the user, from text describing groups to which the user belongs, etc.

The graph in FIG. 6A is similar to the graph described in association with FIG. 4C with the exception that label values—expressed as circular nodes—are assigned to each user node. The labels for the graph include: Dogs, Racing, Stocks, and Gambling.

After the first iteration, as shown in FIG. 6A, Abby node 418 has label values 602 that include Dogs=1.0. Bob node 420 has label values 604 that include Racing=0.5 and Stocks=0.5. Ernie node 426 has label values 610 that include Stocks=0.5 and Gambling=0.5. During the initial iteration, the inferred label generator assigns the label values to the user nodes based on the label values 428, 430, and 432. The remaining label values not mentioned for the nodes are null in this example.

Both Cal node 422 and Dale node 426 have label values 606 and 608, respectively, that are null. This may occur if Cal and Dale's user profiles do not have any (or enough) information for use by the classifying module 224, which assigns initial label values to the user nodes.

Figure 6B:
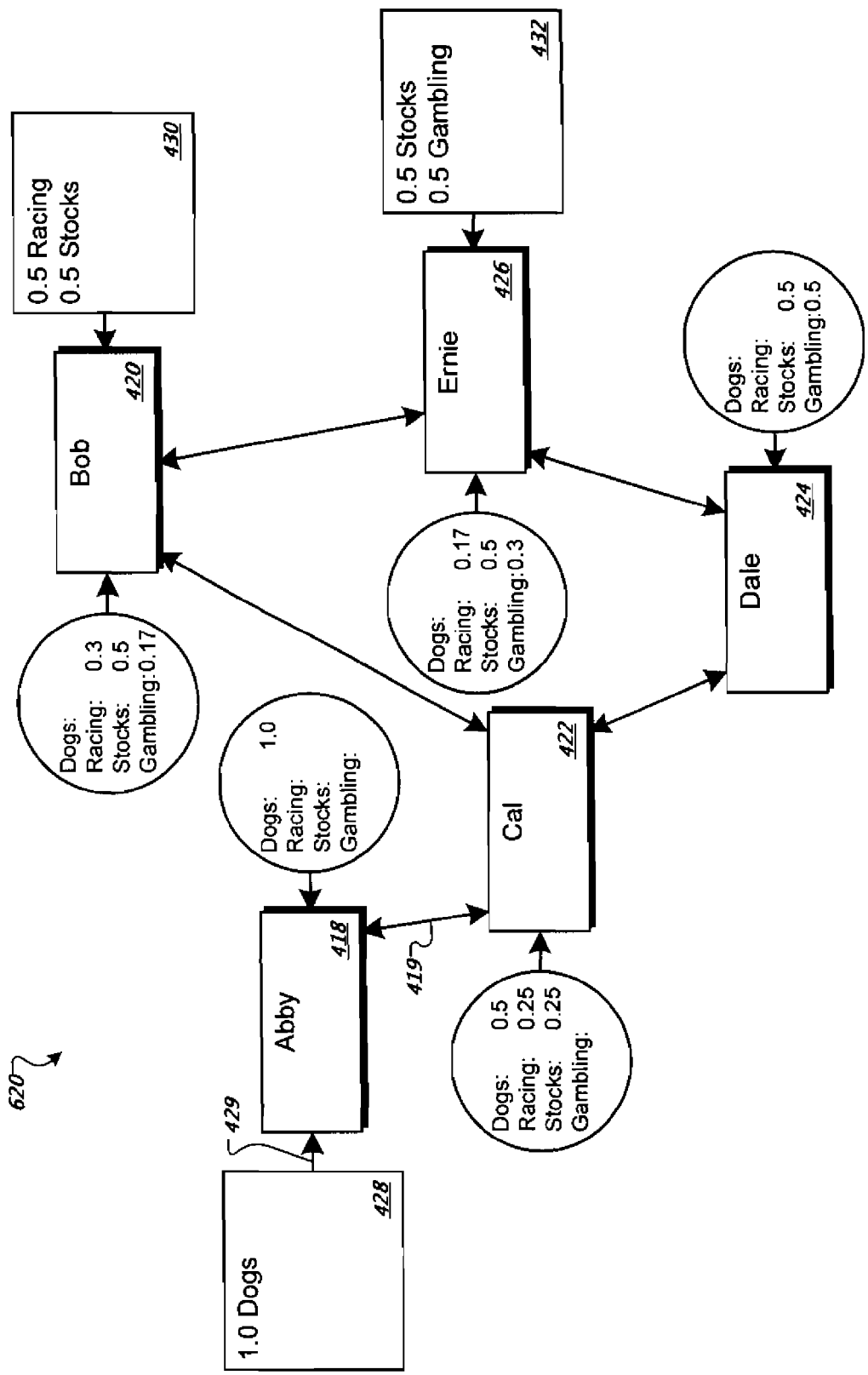

FIG. 6B shows the graph of FIG. 6A after a second iteration of the algorithm. In this example, the user nodes are assigned label values based on neighboring user nodes. For example, the inferred label generator can increase Cal node's label value for Dogs to 1.0 based on Abby node, and increase the label value for Racing and Stocks to 0.5 each. Cal node does not gain any label value information from Dale node during this iteration because Dale node previously had null values for all label values. After normalizing, Cal node's label values are Dogs: 0.5. Racing: 0.25, Stocks: 0.25, and Gambling: null. The other user node label values can be modified in a substantially similar way.

In certain implementations, the label nodes, such as 428, 430, and 432, are not modified. Instead, for every iteration, the label nodes can provide one or more static label values that are used to modify the label values of user nodes to which they are linked.

Figure 6C:
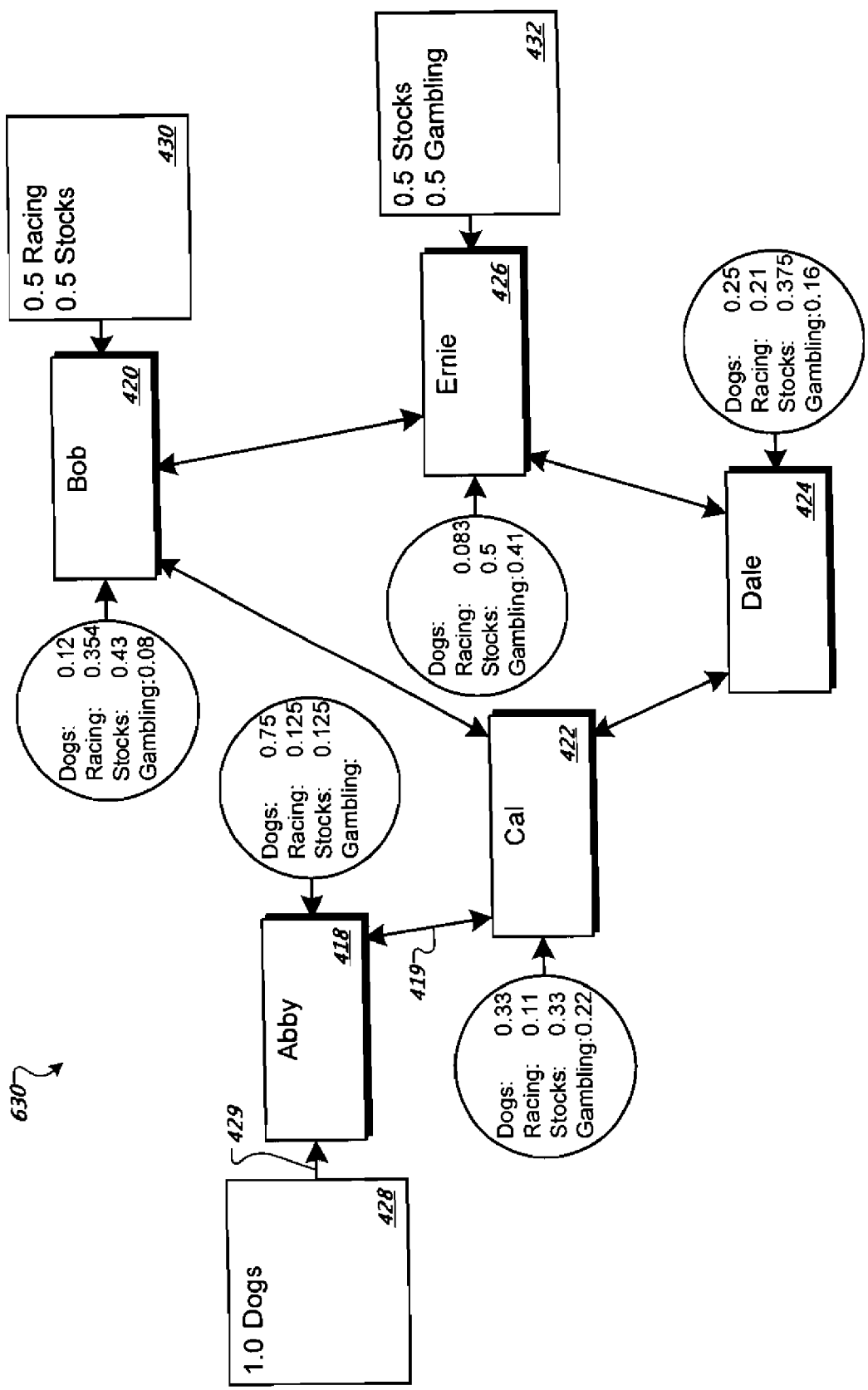

FIG. 6C shows the graph of FIG. 6A after a third iteration of the algorithm. The label values for each user node continue to be modified based on neighboring user nodes. For the third iteration, Abby node does not yet have any Gambling label value yet, the Stocks label is reinforced by Bob and Ernie nodes, Dale node has a Stocks label value greater than a Gambling label value based on Cal and Ernie nodes' dual contribution to the Stocks label. Additionally, Cal node receives more contribution to the Stocks label than the Racing label, and Cal node receives more contribution to the Gambling label than the Racing label.

Figure 6D:
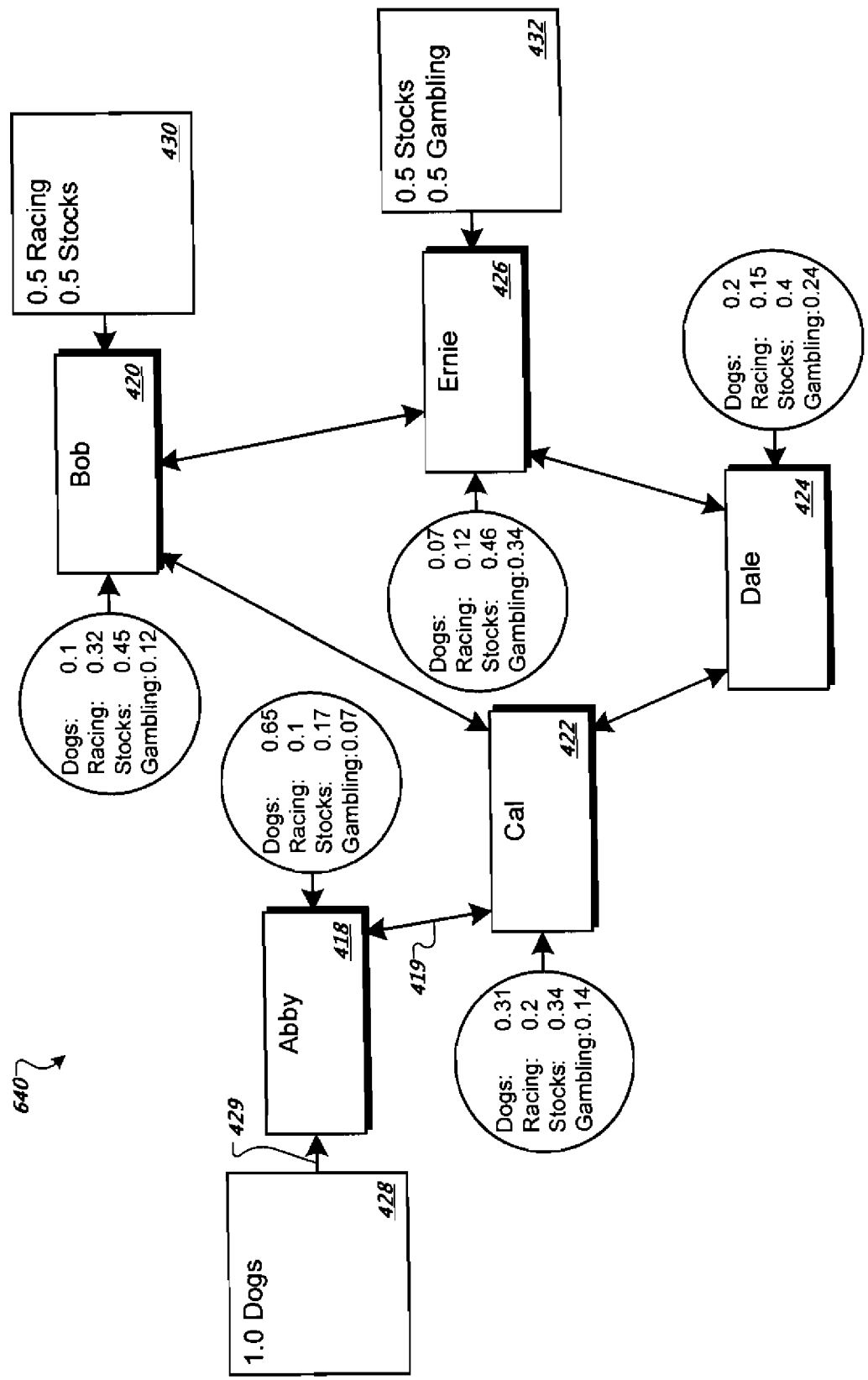

FIG. 6D shows the graph of FIG. 6A after 100 iterations of the algorithm. The label values for each user node are approaching steady state values. In this example, every user node has label values for each of the labels. For the Cal node, the labels Stocks and Dogs have the highest influence, and the Racing label has a greater value than the Gambling label. The influence of the label Dogs on the Ernie node is the same as the influence of the label Gambling on Abby.

Figure 6E:
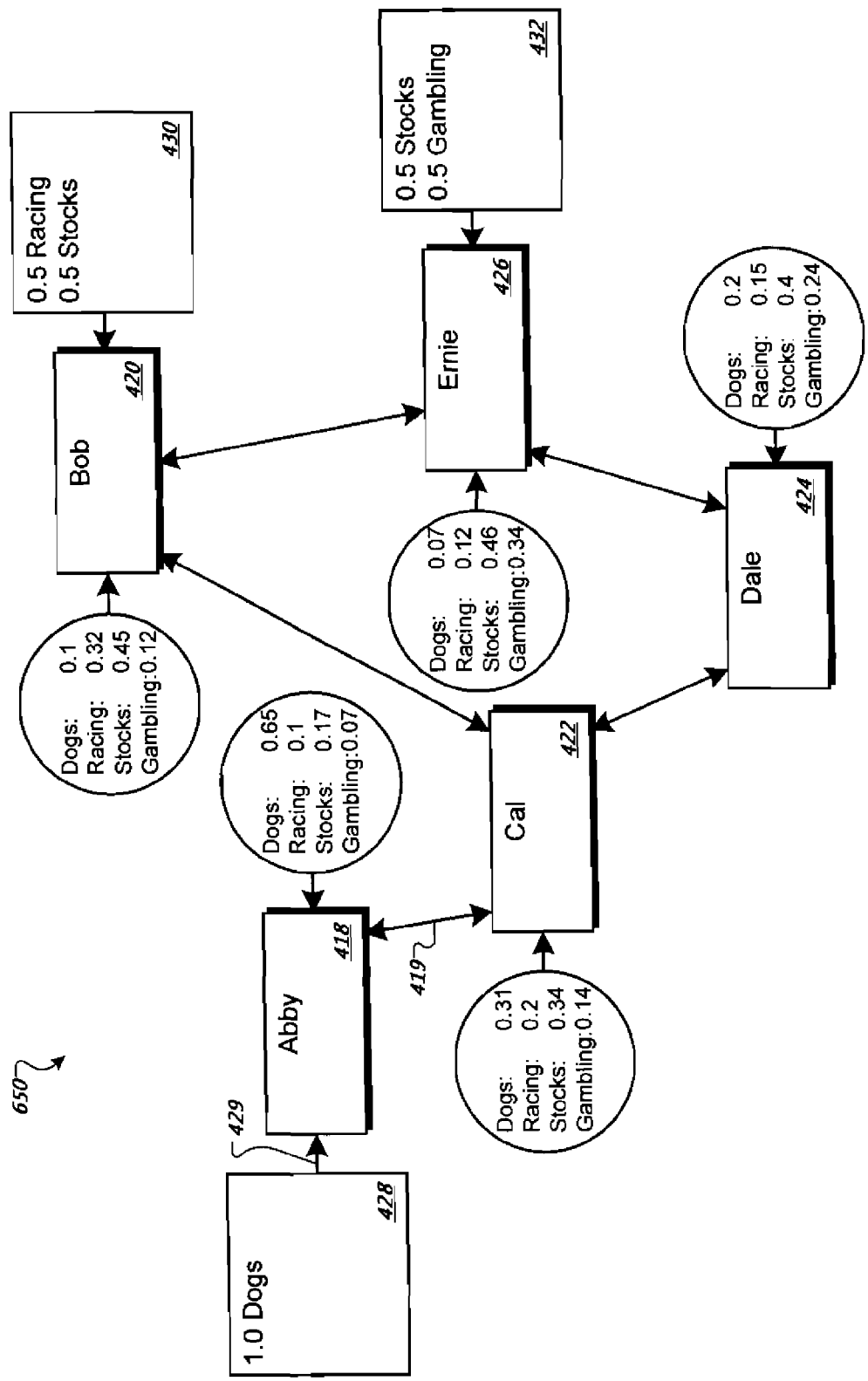

FIG. 6E shows the graph of FIG. 6A after 1000 iterations of the algorithm. The label values for each user node have substantially reached steady state values as indicated by that fact that the label values for the user nodes are substantially equal to the label values obtained after 100 iterations of the algorithm.

Figure 7:
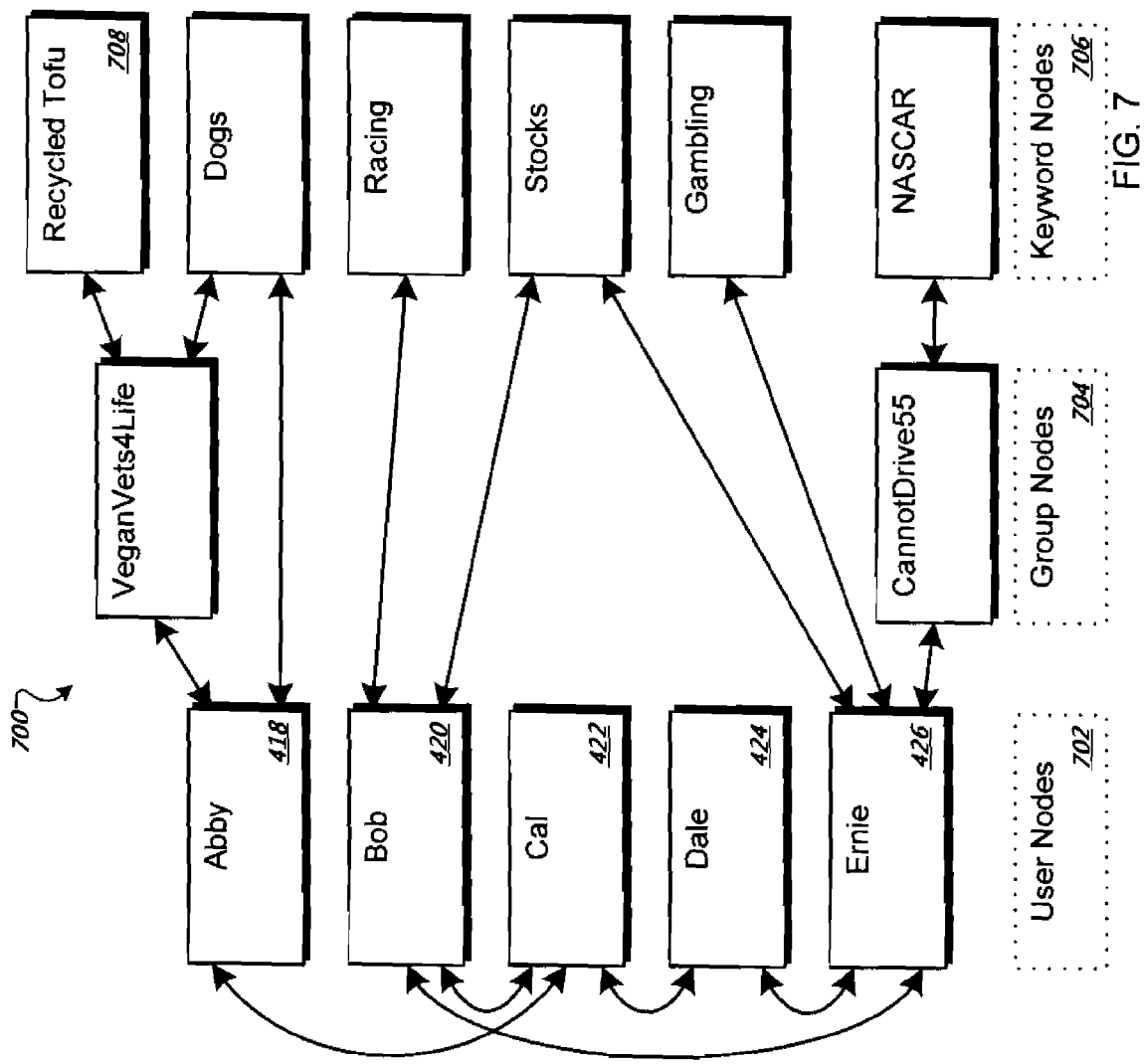
FIG. 7 is an alternative exemplary graph for use in inferring user interests.

FIG. 7 is an alternative exemplary graph 700 for use in inferring user interests. In some implementations, the graph 700 is substantially similar to the graph described in association with FIG. 4D, however, the label nodes that inject static label values are excluded for clarity. The graph 700 includes user nodes 702, group nodes 704, and keyword nodes 706. Here, for the purpose of this example, the labels are keywords. The user nodes 702 can be linked to the group nodes 704 based on membership relationships as discussed previously, and the user and group nodes 702, 704 can be linked to the keyword nodes 706 in a substantially similar way as these nodes 702, 704 are linked to other label nodes.

In certain implementations, one or more of the keyword nodes 706 include terms that do not correspond with advertiser-selected terms used to select online ads for display. For example, the keyword "recycled tofu" associated with keyword node 708 may not be an advertiser-selected term (also referred to as a non-selected term). In some implementations, the inferred label generator 204 does not propagate label values related to this keyword throughout the nodes of the graph. Instead, the non-selected term is associated with advertiser-selected terms. This process is described in more detail in association with FIG. 9C.

Figure 8:
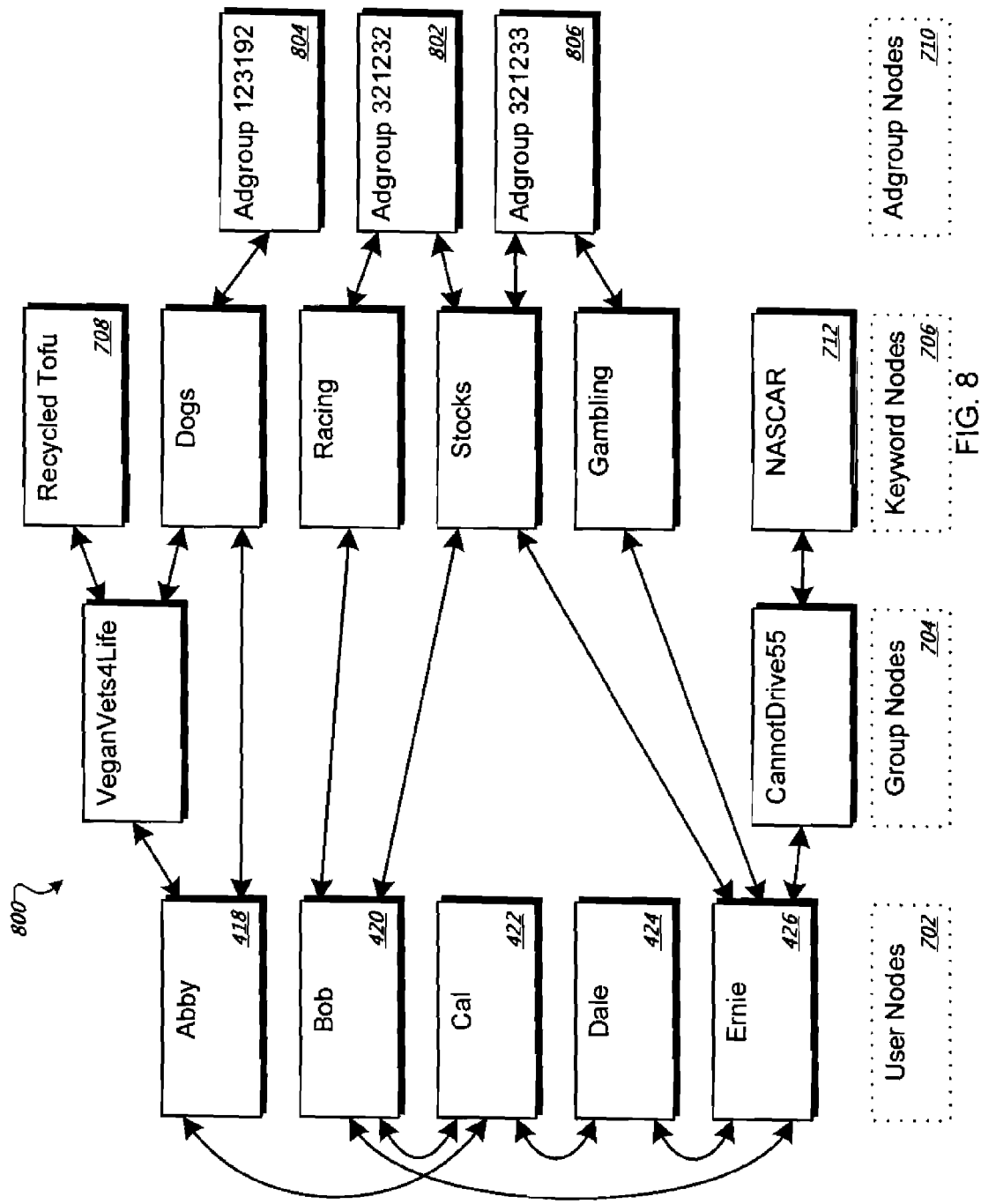
FIG. 8 is an alternative exemplary graph having nodes that include groups of advertiser-selected terms.

FIG. 8 is an alternative exemplary graph 800 having nodes that include groups of advertiser-selected terms. In some implementations, the inferred label generator uses the nodes that include groups of advertiser-selected terms, or Adgroup nodes 710, to determine which keyword nodes to propagate through the graph. For example, the Adgroup nodes can be linked to keywords that are included in a list of advertiser-selected terms.

The keywords nodes that include non-selected terms, such as the recycled tofu and NASCAR keyword nodes 708, 712 are not connected by edges to any of the Adgroup nodes 710. The keyword nodes that include non-selected terms can be left in the graph in some implementations and may provide a source of inductive bias.

Figure 9A:
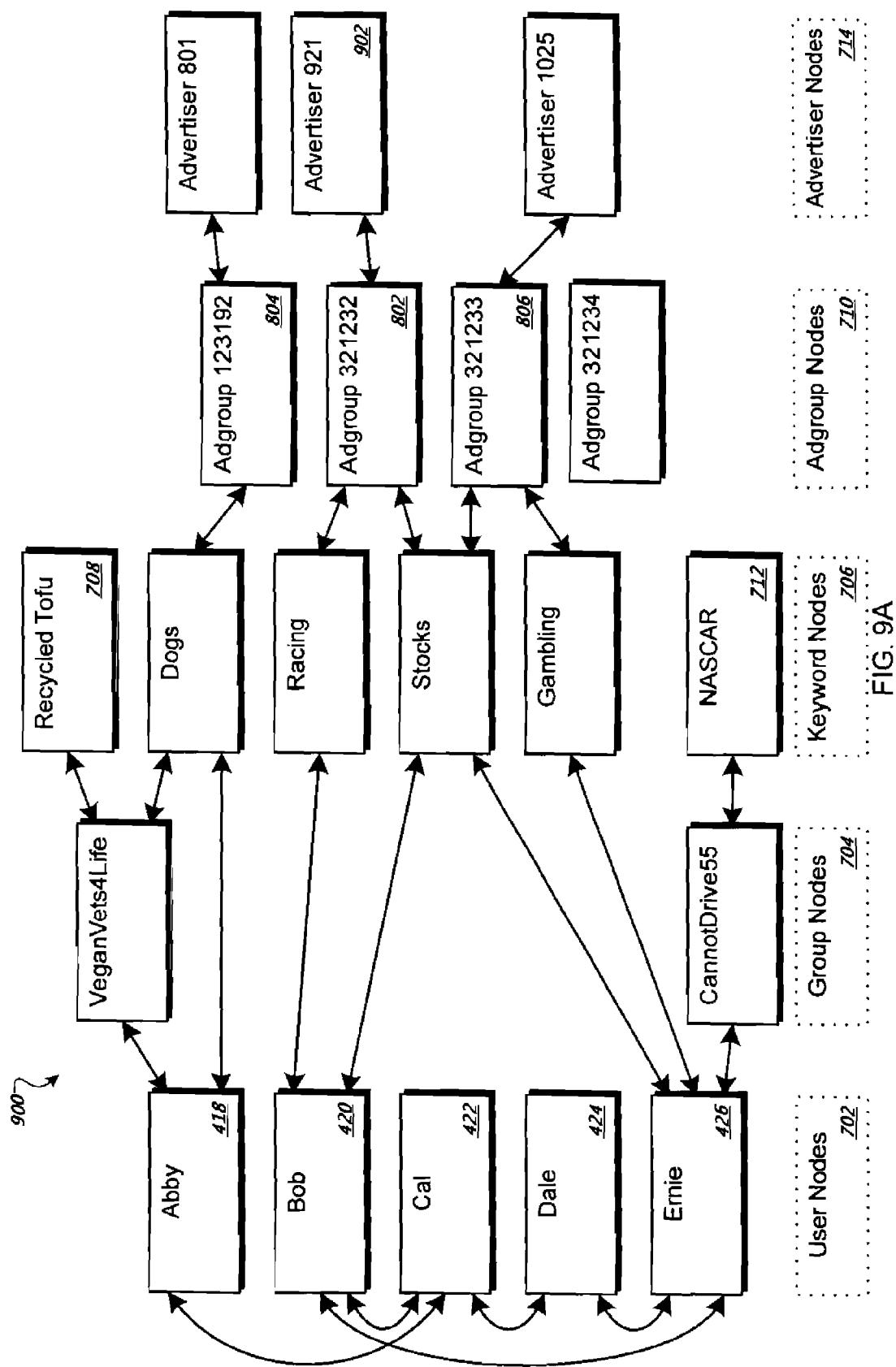
FIGS. 9A-9C are alternative exemplary graphs that include additional nodes, which are used to infer labels for nodes within the graphs.
Figure 9B:
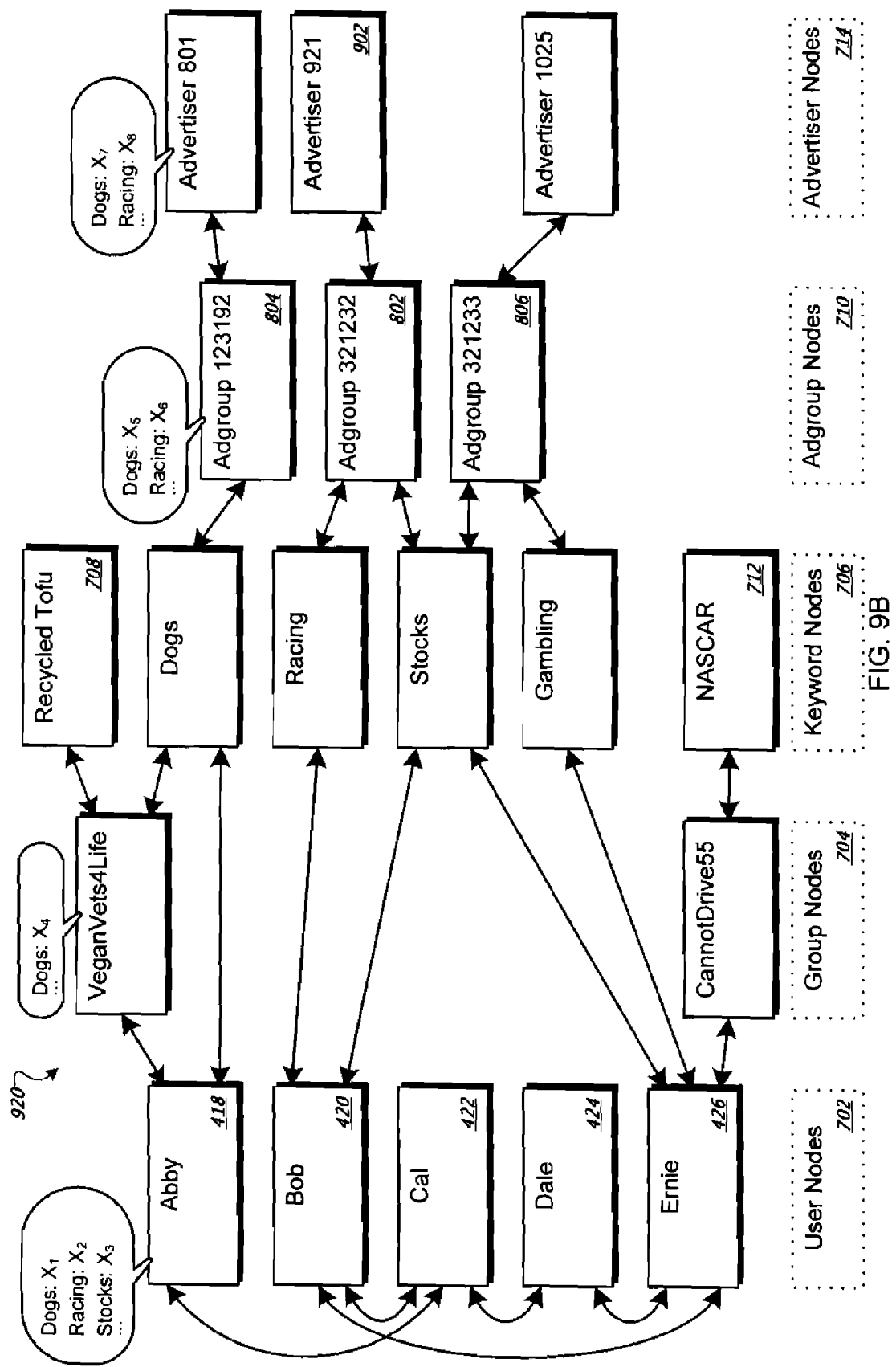
Figure 9C:
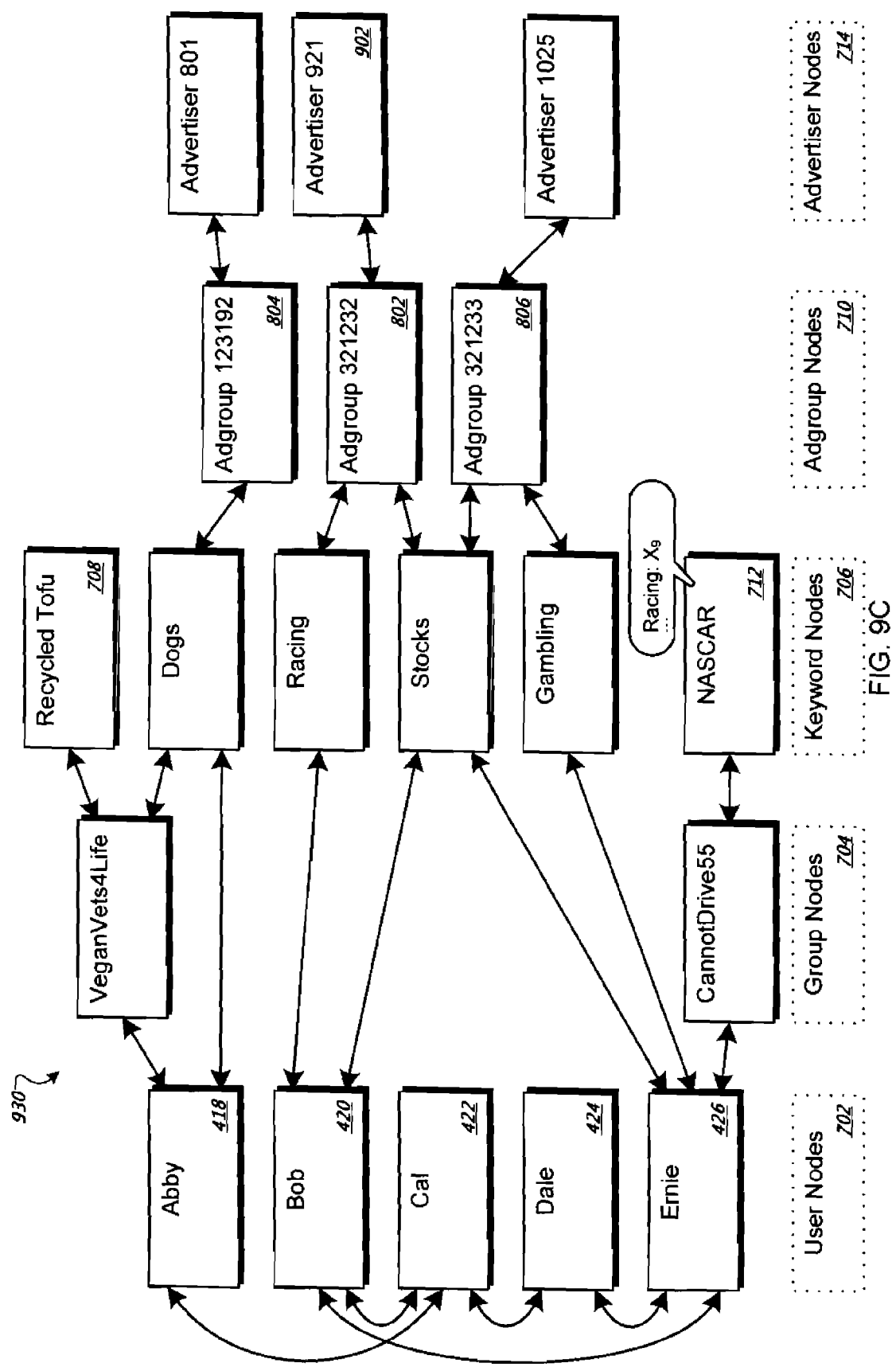

FIGS. 9A-9C are alternative exemplary graphs that include additional nodes, which are used to infer labels for nodes within the graphs. FIG. 9A is an alternative exemplary graph 900 having advertiser nodes 714. The advertiser nodes may represent advertisers in some implementations. The advertising nodes 714 can be linked by edges in the graph to Adgroup nodes 710 that include keywords specified by advertisers. For example, Advertiser 921 node 902 can be associated with an advertiser that specified Racing and Stocks as keywords used to determine when to display advertiser 921's online ads. This is illustrated by the graph 900 that has edges that link the Advertiser 921 node 902 to the Adgroup 321232 node 802 (which is linked to Racing keyword node and a Stocks keyword node).

FIG. 9B is the alternative exemplary graph 900 of FIG. 9A after labels have been inferred to nodes of the graph. In this example, every node in the graph is associated with an advertiser-selected keyword using one or more of the algorithms or methods discussed previously. As shown in FIG. 9B, the Abby node 418 includes label values $X_1$, $X_2$, and $X_3$, respectively, for labels Dogs, Racing, and Stocks. VeganVets4Life group node, Adgroup 123192 node 804, and Advertiser 801 node also include label values $X_4$-$X_9$, as shown in FIG. 9B.

FIG. 9C shows non-selected keywords mapped to advertiser-selected to keywords. In this example, after the inferred label generator 204 has executed one or more of the algorithms as described above, the non-selected keyword has label values that correspond to keywords that were selected by advertisers. For example, the NASCAR keyword node 712 includes a label value for the label Racing, which is a keyword selected by the advertiser 921.

In the implementation illustrated in FIGS. 9A-9C every node is directly or indirectly linked to a keyword selected by an advertiser. This may permit an advertiser to target a user regardless of whether the user is directly associated with an advertiser-selected keyword. For example, the Ernie node 426 is associated with the NASCAR node 712 by way of a membership relationship with the CannotDrive55 group node. The advertiser 921 can target Ernie with ads associated with the keyword Racing because the NASCAR keyword node is mapped to the Racing keyword node as shown.

If a user, such as a new member of the social network system, does not have labels and joins the group—as represented graphically by linking the user's node to the group's node—an advertisement (ad) server can use keywords associated with the group node to advertise to the user. Additionally, if the user is associated with keywords, the inferred label generator 204 can combine the current keywords with keywords that are associated with the group she joins.

As discussed previously, the inferred label generator can use multiple graphs to determine the label values and compare the output of processed graphs to determine final label values based on expected an a priori distribution.

Figure 10:
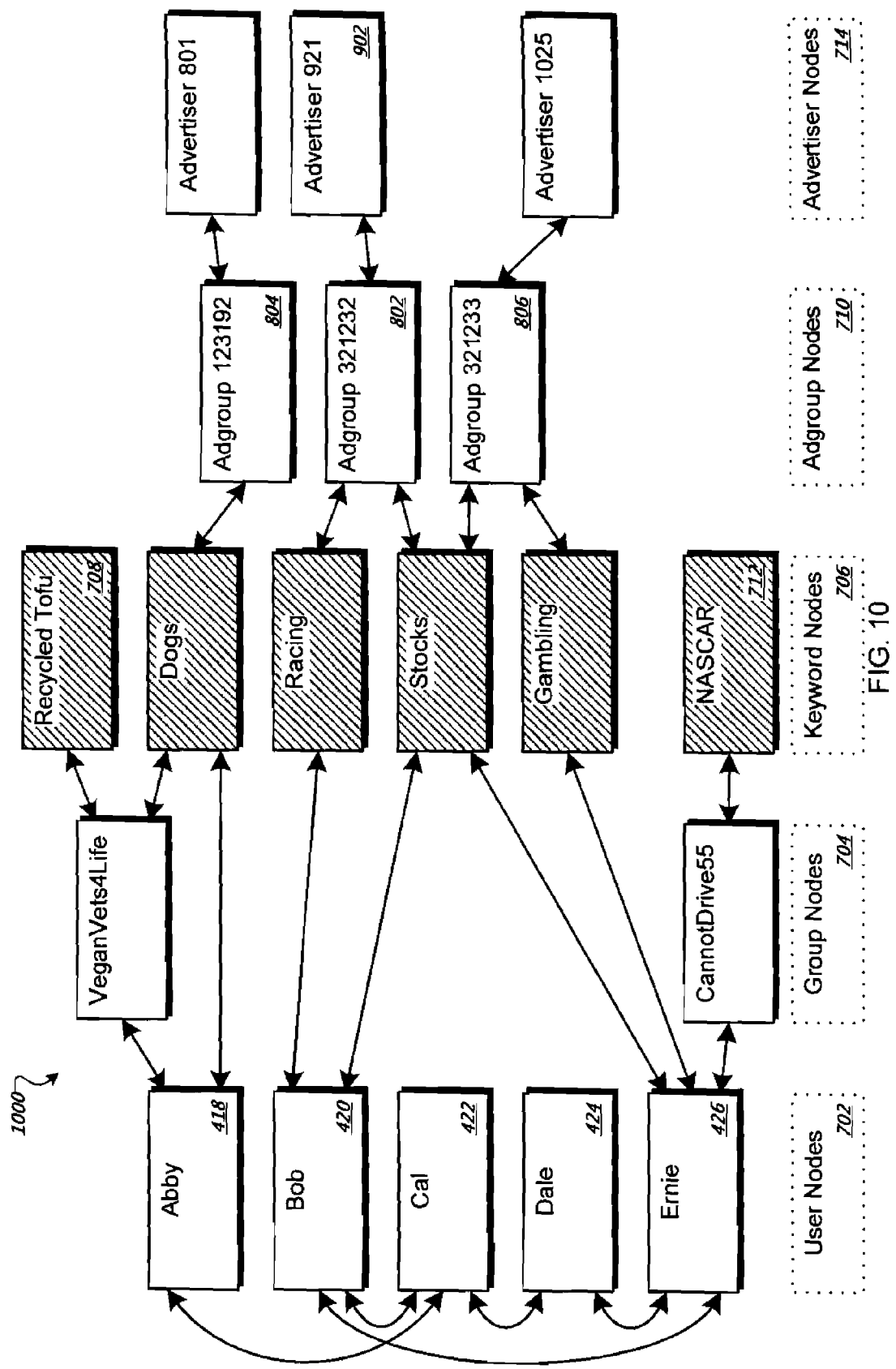
FIG. 10 is a graph where all the keywords are used as labels.

FIG. 10 is a graph 1000 where all the keywords are used as labels. Propagating all the keyword labels through the graph 1000 can generate keyword labels for advertiser nodes 714 that are specific to the social network system that is graphed. The inferred label generator can output the keyword labels associated with a particular advertiser node as suggestions for other keywords that the advertiser should select for advertising purposes. In some implementations, a subset of the keywords can be selected—instead of all the keywords—for propagation throughout the graph.

Figure 11:
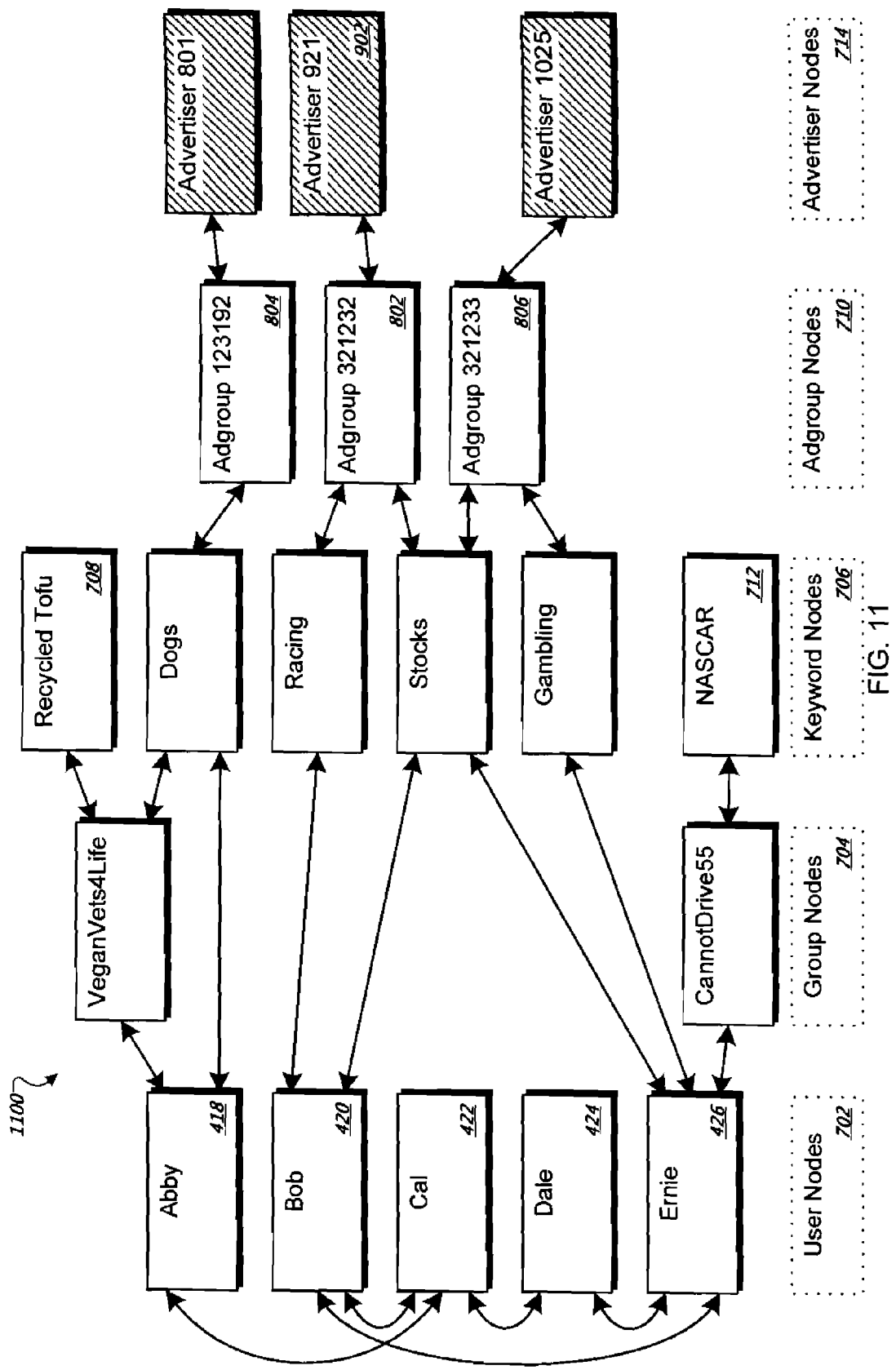
FIG. 11 is a graph, where the advertisers are used as labels.

FIG. 11 is a graph 1100, where the advertisers are used as labels. Propagating the advertisers (or a subset of advertisers) through the graph 1100 can generate advertiser labels for each user node, group node, or keyword node. This may suggest which advertiser is most likely to be associated with each of these nodes.

Figure 12:
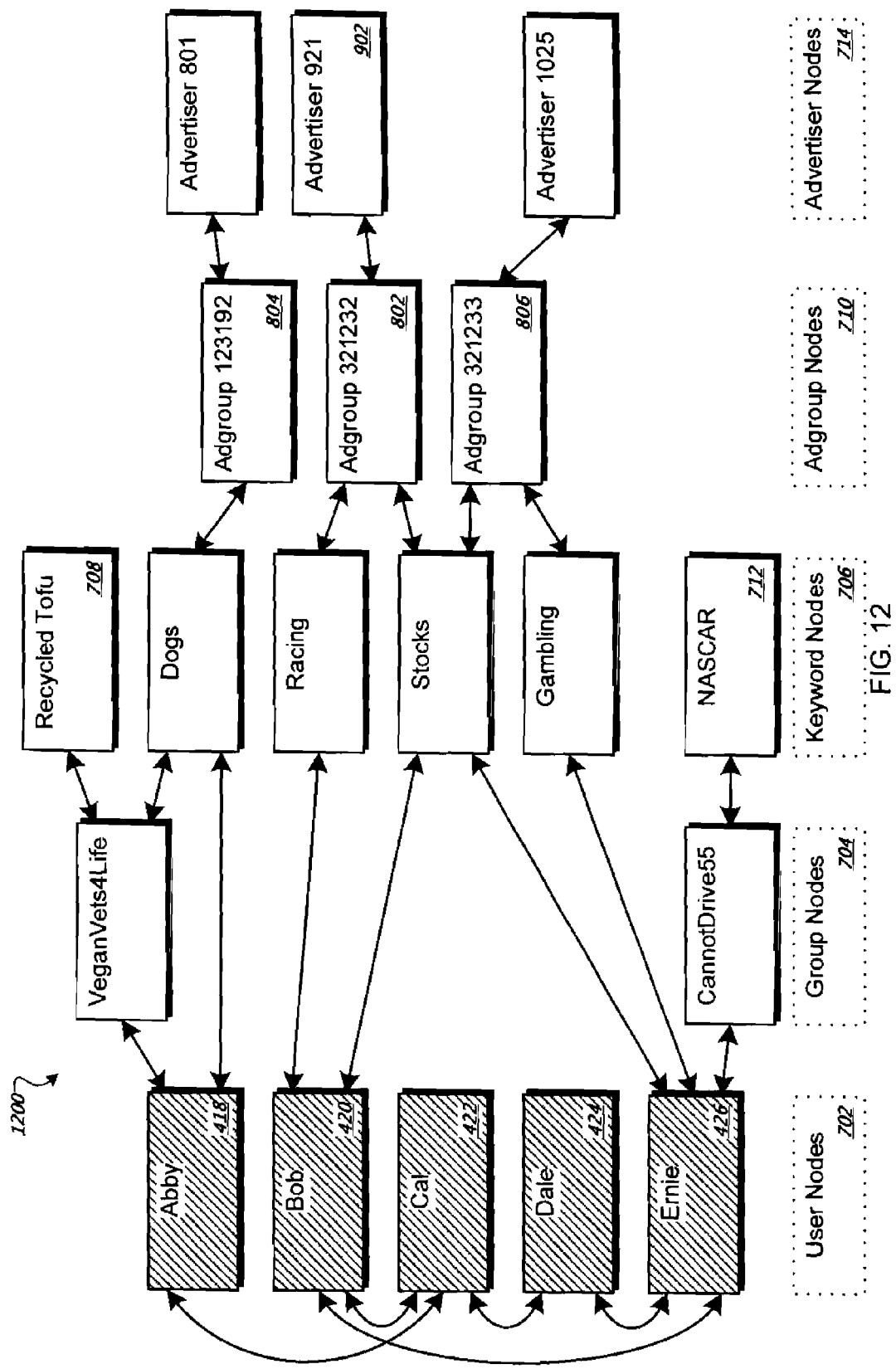
FIG. 12 is a graph, where the users are used as labels.

FIG. 12 is a graph 1200, where the users are used as labels. Propagating the users (or a subset of users) through the graph 1200 can generate user labels for each of the other nodes in the graph. This may suggest which user is most likely to be associated with an advertiser, a group, a keyword, and an Adgroup. Additionally, if user labels are generated for user nodes, the inferred label generator may determine which users are similar to each other based on the user labels associated with a particular user node.

Figure 13:
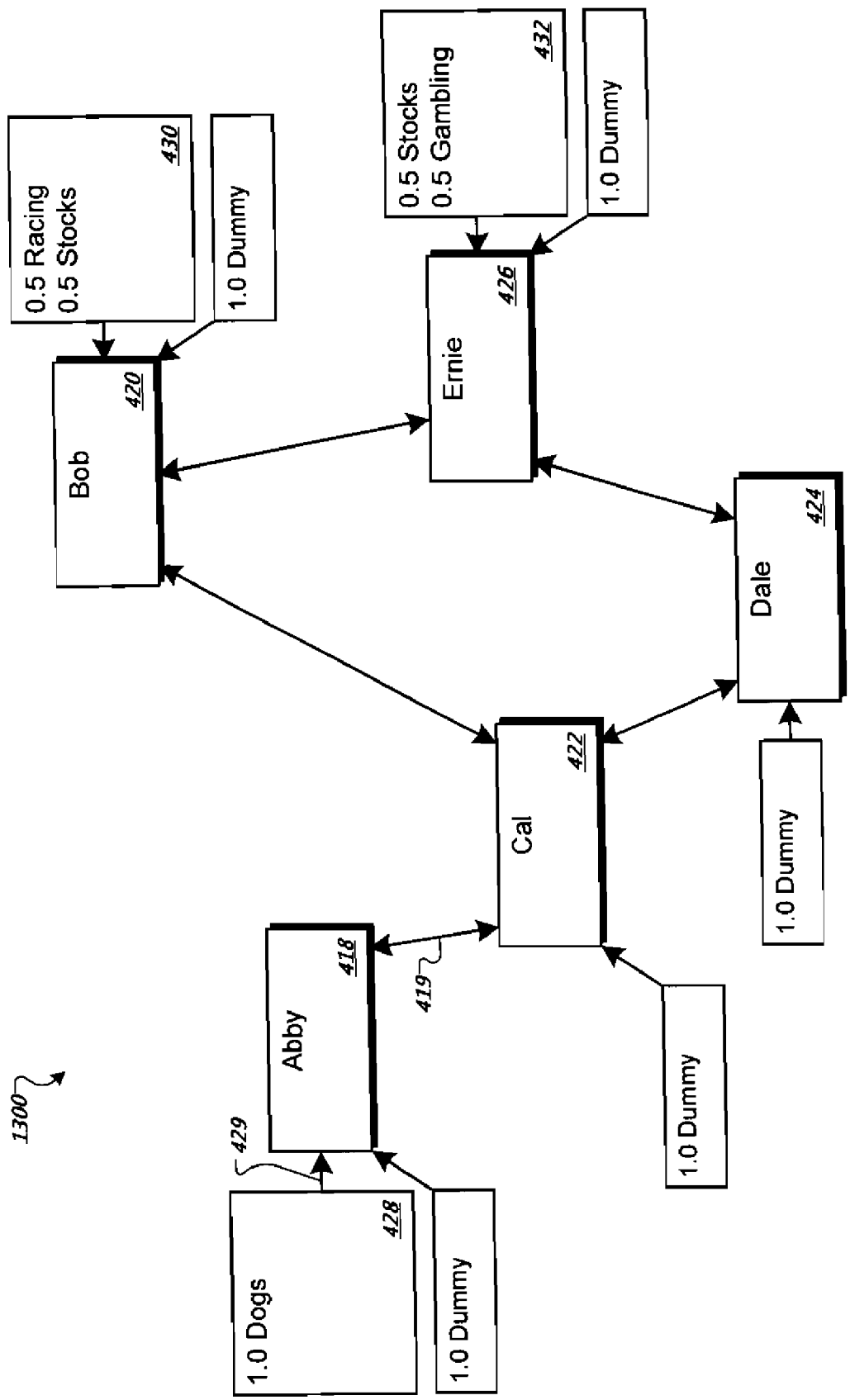
FIG. 13 is a graph that includes dummy nodes.

FIG. 13 is a graph 1300 that includes dummy nodes. In certain implementations, dummy nodes can be used in the graph 1300 to reduce effects of distant neighboring nodes.

When the label of a node is determined based on, for example, the label with the greatest label value, the weight assigned to the dummy label can be ignored and the remaining weights used in the determination. For example, the dummy nodes' contribution can removed from the calculation of the label values at the end of the algorithm (e.g., after the label values have reached a steady state or a specified number of iterations have occurred).

In certain implementations, dummy nodes can be used in all of the graphs generated by the inferred label generator. In other implementations, a user may specify for which graph(s) the dummy nodes may be used.

FIG. 13 shows an implementation where the dummy nodes are associated with all nodes in the graph. In other implementations, dummy nodes are assigned to a small number of nodes, such as nodes that are not associated with initial labels based on the content of user profiles, etc.

Figure 14:
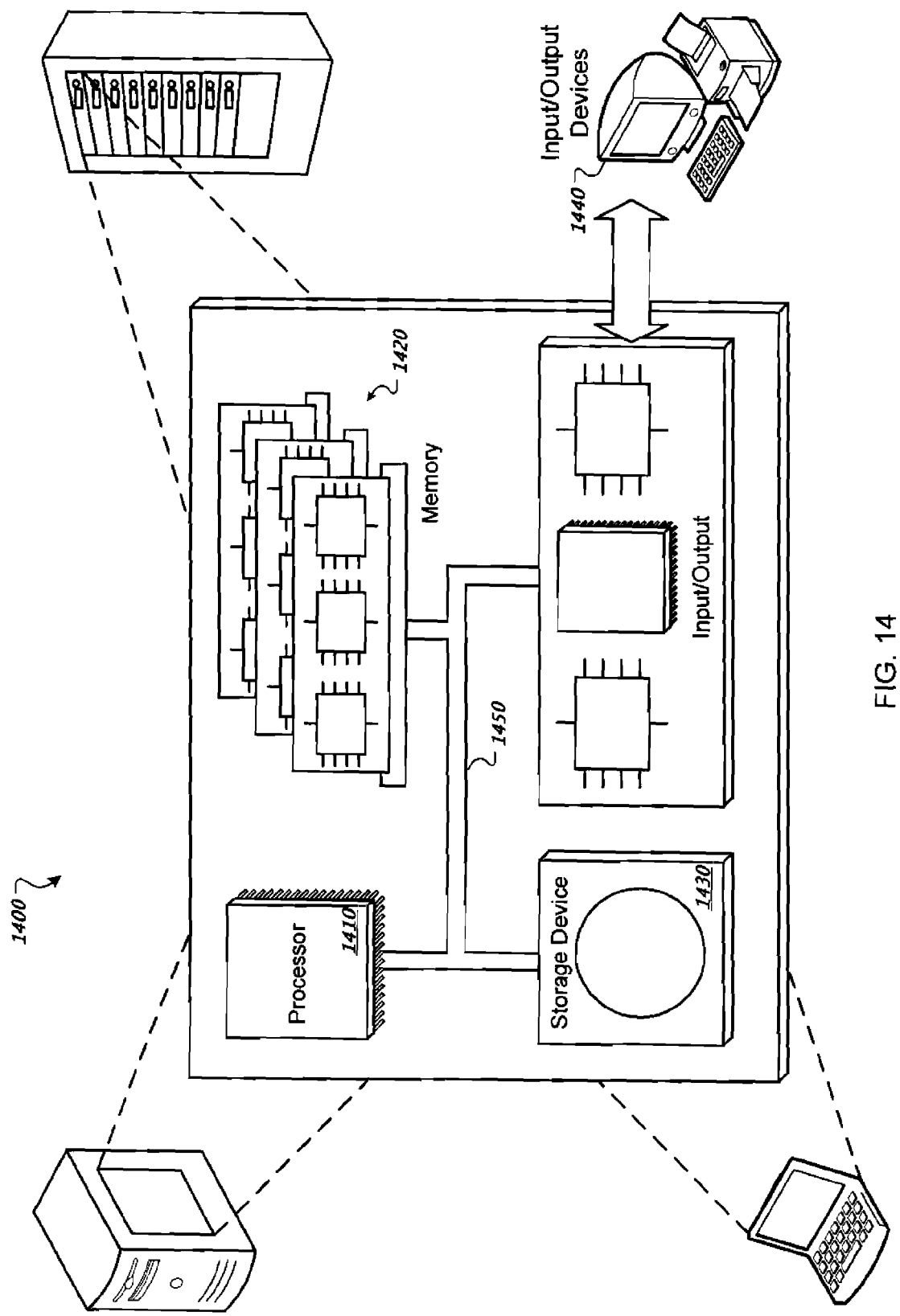
FIG. 14 is a schematic diagram of a computer system 1400.

FIG. 14 is a schematic diagram of a computer system 1400. The system 1400 can be used for the operations described in association with any of the computer-implement methods described previously, according to one implementation. The system 1400 is intended to include various forms of digital computers, such as laptops, desktops, workstations, personal digital assistants, servers, blade servers, mainframes, and other appropriate computers. The system 1400 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 1400 includes a processor 1410, a memory 1420, a storage device 1430, and an input/output device 1440. Each of the components 1410, 1420, 1430, and 1440 are interconnected using a system bus 1450. The processor 1410 is capable of processing instructions for execution within the system 1400. In one implementation, the processor 1410 is a single-threaded processor. In another implementation, the processor 1410 is a multi-threaded processor. The processor 1410 is capable of processing instructions stored in the memory 1420 or on the storage device 1430 to display graphical information for a user interface on the input/output device 1440.

The memory 1420 stores information within the system 1400. In one implementation, the memory 1420 is a computer-readable medium. In one implementation, the memory 1420 is a volatile memory unit. In another implementation, the memory 1420 is a non-volatile memory unit.

The storage device 1430 is capable of providing mass storage for the system 1400. In one implementation, the storage device 1430 is a computer-readable medium. In various different implementations, the storage device 1430 may be a floppy disk device, a hard disk device, an optical disk device, or a tape device.

The input/output device 1440 provides input/output operations for the system 1400. In one implementation, the input/output device 1440 includes a keyboard and/or pointing device. In another implementation, the input/output device 1440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. In certain implementations, the label nodes do not have to be high-level semantic nodes. Instead, they may be individual semantic nodes. For example, they may be the union of the set of keywords that occur on every user's page/description of themselves and every group's description, etc.

In other implementations, they may be keywords that are uncommon. For example, the common word "the" may not provide much information, but the relatively uncommon keyword "basketball" may.) These types of words can be used by classifying module 224 when implementing, for example, the common TF-IDF (term frequency—inverse document frequency) measure. Additionally, the keywords can be selected from terms that advertisers often use to target online ads, or keywords including hand-selected terms that are of interest.

In certain implementations, the graph or graphs that are created do not have to have an edge between all the friends that a user specifies. If the friends are ranked or weighted, only the top-N friends may be chosen (e.g., a user's best friends). In other implementations, the inferred label generator 204 may only select the links for which each user specifies each other as a friend.

In yet other implementations, a graph may have weighted edges. In some implementations, each connection can be weighted the same. In other implementations, edges can be weighted differently based on a number of factors. For example, if user-A specifies that he likes user-B more than user-C, then the connection from A to B may be stronger than from A to C. In another example, if user-A and user-B both specify that they like each other, the strength of the connection may be stronger (for example, the connection may be twice as strong). In yet another example, the inferred label generator can weight the edges in proportion to the out-degree of a node.

Other weighting factors can be based on whether a user identifies with one group more than another group. In this case, the weights on the edges may be greater for preferred groups, such as groups that include frequent content postings from the user. Also, a user may have a stronger affinity for some keywords rather than for other keywords (e.g., a user may use the word "venture" much more than the word "sports"). Weights between users also can be based on a frequency of interaction, such as messages, visits to each other's sites, etc., between the users.

In other implementations, edges can be weighted based on when a 'friend' was added. For example, a link to a recently added friend can be weighted greater than previously added friends because the recently added friend may indicate a current interest. In another implementation, an edge linking an "older" friend can be weighted more heavily. For example, if the friend has been a friend for a while, and it is known that the user takes off friends periodically, then a friend who has lasted on the friend list can be weighted higher. Additionally, similarity metrics between users (e.g., a percent of overlap in the words that they use) can be used to weight the connections. For example, users that have a heavy overlap in term usage can have links that are weighted more heavily than users who do not have a significant overlap.

In some implementations, the described algorithm and methods do not have to run until convergence. They can be stopped earlier, and the inferred label generator can read the magnitudes of the label values at the nodes.

In some implementations, the combination-weights that are used to combine the end results may be set to (0,1) or (1,0), which selects only one of the graphs and not the other. Additionally, the combination function may not be linear or continuous. For example, the inferred label generator may specify that if the labels produced from graph-A are too uniform then only labels generated from Graph-B are selected for use, for example, in targeting online ads.

Additionally, the term 'user,' as specified, for example, in the described pseudo code and method 500, may actually be a group in the social network system. Additionally, the term "user" can be substituted for other entities described in the graphs, such as keywords, advertisers, Adgroups, etc.

In certain implementations, the set of labels used can include advertisements. For example, the labels propagated through the graph can include advertisements on which one or more users have clicked. In this implementation, after advertisement labels are inferred throughout a graph, for each user, the inferred label generator can output a set of advertisements on which each user may be likely to click.

In another implementation, the inferred label generator can select labels for users to target ads, etc., where the labels are derived based on an initial machine-learning classification, or the inferred label generator can use the inferred labels generated by executing the above algorithms and methods on the graph to infer labels for each user.

In certain implementations, we can apply the same algorithms and methods based on a directed graph between users (e.g., if user A says that user B is a friend, this is a directed edge instead of an undirected one, which implies that user B specifies that user A is also a friend).

Additionally, in a data structure, such as the graph 440 of FIG. 4D, the links between users may be optional if there are enough common groups/keywords. For example, there may be "enough" common groups/keywords if a defined threshold of the graph connectivity is met (e.g., if the average user node is connected by two edges to at least two other users, etc)

In certain implementations, if there are more labeling nodes having label-A than having label-B, the inferred label generator can normalize each label value so that the sum of the label values for each type is the same for each label (e.g., across all labeling nodes, the sum of label-A=1.0 and across all labeling nodes, the sum of label-B=1.0).

In other implementations, the normalization step as described in the algorithms and methods linearly weights the magnitudes of the label values and scales them to 1.0; however, the inferred label generator can use various normalization or non-linear function for normalization.

Edges between keywords and advertisers can be added, for example, to show that an advertiser is only interested in a small set of keywords, or has only one Adgroup, etc.

Additionally, click-through-rates can be incorporated into the algorithm. In some implementations, a click-through-rate can include the number of times that an advertisement is either displayed to a viewer or selected by the viewer. The click-through-rate can be calculated based on advertisements displayed on other websites or solely on the social network. For example, the click-through-rate can be calculated based on every time an advertisement is displayed on a search engines websites in response to search queries. This click-through-rate can be used to estimate the click-through-rate for the advertisement when used for the social network. In another example, the click-through-rate can be calculated based on every time an advertisement is displayed is association with a website, regardless of which web site displays the advertisement (e.g., a system such as Google's AdSense, which servers ads to display on websites, can calculate a click-through-rate).

If the click-through-rate is determined by a separate system, the inferred label generate can request this information when determining a weight to apply to an edge. In the previous examples described, the connections between keywords and Adgroups or advertisers is shown unweighted. The connections may also be weighted to reflect click-through-rates that an advertiser/Adgroup has with a particular keyword. For example, the higher the click-through-rate the higher the weight. In other implementations, only connections with a minimum click-through-rate (or effective expected revenue derived, for example, from [expected click-through-rate multiplied by the amount the advertiser has bid]) are modeled between keyword and Adgroup I advertiser. Adgroups/advertisers that do not have a minimum click-through-rate, may be eliminated from the algorithms or methods used to determine labels. In still other implementations, advertisement click-through feedback can be used to tune the weights between edges based on a series of test iterations.

The inferred label generator can modify a graph's structure (e.g., remove a percentage of the connections, such as the connections that fall within the lowest one percent of weighted connections). This may approximate the random walk discussed previously. Additionally, instead of maintaining all labels at every node, the inferred label generator may only maintain subset of the labels.

In parallel implementations, highly connected nodes may be processed using the same processor, which may reduce message passing. Additionally, the approximation can be computed in a layer-wise manner, where each layer includes, for example, a certain type of node. For example, one layer may include user nodes, another layer group nodes, and another layer keyword nodes, as shown in FIG. 9A. In some implementations, the algorithms and methods discussed above can be computed for pairs of layers instead of all the layers at once. For example, some number of iterations of the method are computed between a first and second layer, some between the second and third layer, and some between the third and fourth layer) and then the method can be repeated, etc.

In addition, the logic flows depicted in the figures do not require the particular order shown, or sequential order, to achieve desirable results. In addition, other steps may be provided, or steps may be eliminated, from the described flows, and other components may be added to, or removed from, the described systems. For example, the first and second data stores 206, 208 can reside in a single storage device, such as a hard drive.

Accordingly, other implementations are within the scope of the following claims.

What is claimed is:

1. A computer-implemented method comprising:
    determining, with a computer server system that includes one or more processors, initial label values for at least a portion of a group of users of a social network, wherein each of the label values indicates a probability that a user is interested in a subject indicated by a label;
    associating a first user with a first plurality of users from the group of users and a second user with a second plurality of users from the group of users based on social relationships associated with the first user and the second user, respectively, wherein the first plurality of users includes the second user and the second plurality of users includes the first user;
    determining label values for the first user and the second user based on bi-directional propagation of label values, wherein the bi-directional propagation of label values comprises: determining a first label value for the first user based on a combination of label values for the first plurality of users including a label value for the second user; and determining a second label value for the second user based on a combination of label values for the second plurality of users including the determined first label value for the first user; and outputting the first label value for the first user and the second label value for the second user.

2. The method of claim 1, wherein the determined first label value for the first user comprises a revised label value of an initial label value that was assigned to the first user, revised based on the combination of the label values for the first plurality of users.

3. The method of claim 1, wherein the first user is associated with the first plurality of users through a common group membership.

4. The method of claim 1, further comprising identifying labels that specify potential interests of users.

5. The method of claim 1, wherein determining the initial label values for the at least a portion of the group of users comprises classifying users with the label values using machine learning techniques to classify text written by a user to infer label values to associate with the user.

6. The method of claim 5, wherein the text written by the user comprises text on a social network profile of the user, textual posts made by the user, and content of electronic documents associated with a group of which the user is a member.

7. The method of claim 1, wherein the social relationships associated with the first user comprise a group membership or a friendship.

8. The method of claim 1, wherein the label comprises advertising keywords selected by advertisers, non-advertising keywords based on content of profiles and not selected by advertisers, text associated with advertisements a user previously selected, or categories that encompasses a plurality of either advertising or non-advertising keywords.

9. The method of claim 1, further comprising generating a first graph comprising nodes for each user of the social network, wherein the nodes are linked based on the social relationships associated with the users of the social network.

10. The method of claim 9, wherein the first graph further comprises nodes associated with label values selected from a group consisting of group nodes representing groups of users, label nodes representing labels, advertiser nodes representing advertisers, and nodes representing advertising keyword groups.

11. The method of claim 10, further comprising determining label values for a portion of the nodes of the first graph, the determination comprising for each node of the portion, adding the node's current label value to a weighted value of a neighboring node's label value, for each neighboring node.

12. The method of claim 11, wherein the weighted value is based on an edge that links the nodes.

13. The method of claim 11, wherein neighboring nodes comprise label nodes that have static label values used to determine the label values for the portion.

14. The method of claim 11, wherein the label values for each node of the portion of the nodes is initialized to an initial value before the determination of the label values for the node.

15. The method of claim 14, wherein the initial value is zero.

16. The method of claim 10, further comprising linking user nodes associated with users to label nodes based on whether the users have inferred interests in the subjects indicated by the labels.

17. The method of claim 10, wherein the nodes are further linked based on relationships specified by the advertisers, relationships specified by an advertisement server, or relationships specified by a text classification algorithm.

18. The method of claim 9, further comprising generating a second graph having nodes associated with the users of the social network, wherein the label values are assigned to the nodes using label nodes having a plurality of static label values.

19. The method of claim 18, further comprising determining label values for output using both the first and second graph.

20. The method of claim 19, further comprising selecting final label values for the first user by excluding the label values generated by one of the graphs, by weighting the generated label values equally, or by weighting the generated label values based on a confidence measure that expresses a mathematical confidence in the accuracy of the label values generated by each of the graphs.

21. The method of claim 20, wherein the confidence measure is based on a comparison of a label value to an expected label value distribution.

22. The method of claim 1, further comprising assigning weights to each of the label values for the first plurality of users based on a type of social relationship between the first user and each of the first plurality of users.

23. The method of claim 22, wherein the social relationship is selected from a group consisting of a uni-directional social relationship, a bi-directional social relationship, degree-of-separation social relationship, and a degree-of-page visitation social relationship.

24. The method of claim 22, wherein the weights are used to determine a contribution of the corresponding label values for the first plurality of users when determining the first label value.

25. The method of claim 1, further comprising selecting an advertisement to display in association with the first user based on the determined first label value for the first user.

26. The method of claim 1, further comprising outputting, for the first user, additional label values for different labels based on the label values for the first plurality of users.

27. The method of claim 26, further comprising selecting a label with the greatest label value to associate with the first user.

28. The method of claim 27, further comprising selecting an advertisement to display in association with the first user based on the selected label.

29. The method of claim 26, further comprising normalizing the first label value and additional label values for the first user.

30. The method of claim 1, further comprising determining label values to associate with entities comprising groups of users, groups of keywords selected by advertisers, advertisers, and individual keywords not selected by an advertiser.

31. The method of claim 30, further comprising normalizing the determined label values across all users and entities.

32. The method of claim 1, wherein the label values are determined by iteratively performing the bi-directional propagation of label values until a threshold is reached.

33. The method of claim 32, wherein the threshold is based on a convergence measure or a specified static value.

34. The method of claim 1, further comprising determining the first label value by starting a random walk technique from a first node in a graph representing the first user, the graph comprising nodes representing users, groups of users, labels, advertisers, advertising keyword groups, or combinations thereof.

35. The method of claim 34, wherein the random walk technique comprises recursively selecting additional nodes in the graph linked to previously selected nodes until a node is selected that is used as a label.

36. The method of claim 35, wherein the random walk technique comprises maintaining a count of the nodes that are used as labels.

37. The method of claim 36, wherein the first label value is based on the count maintained.

38. The method of claim 35, wherein the random walk technique further comprises recursively selecting all previously unselected users linked by specified relationships until all linked users have been traversed.

39. The computer-implemented method of claim 1, wherein an initial label value for a user is determined based on information associated with the user's profile on the social network and information associated with the user's activity related to the social network.

40. A system for inferring user interests comprising: one or more processors; a classifying module for determining initial label values for at least a portion of a group of users of a social network, wherein each of the label values indicates a probability that a user is interested in a subject indicated by a label;
means for associating a first user with a first plurality of users from the group of users and a second user with a second plurality of users from the group of users based on relationships associated with the first user and the second user, respectively, wherein the first plurality of users includes the second user and the second plurality of users includes the first user;
means for determining label values for the first user and the second user based on bidirectional propagation of label values, wherein the bi-directional propagation of label values causes (i) a first label value for the first user to be determined based on a combination of label values for the first plurality of users including a label value for the second user, and (ii) a second label value for the second user to be determined based on a combination of label values for the second plurality of users including the determined first label value for the first user; and
an interface for outputting the first label value for the first user and the second label value for the second user.

41. The system of claim 40, wherein determining the initial label values for the at least a portion of the group of users comprises classifying users with the label values using machine learning techniques to classify text written by a user to infer label values to associate with the user.

42. The system of claim 41, wherein the text written by the user comprises text on a social network profile of the user, textual posts made by the user, and content of electronic documents associated with a group of which the user is a member.

43. The system of claim 40, wherein the bi-direction propagation of label values causes weights to be assigned to each of the label values for the first plurality of users based on a type of social relationship between the first user and each of the first plurality of users.

44. The system of claim 43, wherein the social relationship is selected from a group consisting of a uni-directional social relationship, a bi-directional social relationship, degree-of-separation social relationship, and a degree-of-page visitation social relationship.

45. The system of claim 43, wherein the weights are used to determine a contribution of the corresponding label values for the first plurality of users when determining the first label value.

46. The system of claim 40, wherein the label values are determined by iteratively performing the bi-directional propagation of label values until a threshold is reached.

47. The system of claim 46, wherein the threshold is based on a convergence measure or a specified static value.

48. A computer program product tangibly embodied in a non-transitory computer storage device storing instructions that, when executed, cause a processor to perform operations comprising:
determining initial label values for at least a portion of a group of users of a social network, wherein each of the label values indicates a probability that a user is interested in a subject indicated by a label;
associating a first user with a first plurality of users from the group of users and a second user with a second plurality of users from the group of users based on social relationships associated with the first user and the second user, respectively, wherein the first plurality of users includes the second user and the second plurality of users includes the first user;
determining label values for the first user and the second user based on bi-directional propagation of label values, wherein the bi-directional propagation of label values comprises: determining a first label value for the first user based on a combination of label values for the first plurality of users including a label value for the second user; and
determining a second label value for the second user based on a combination of label values for the second plurality of users including the determined first label value for the first user; and
outputting the first label value for the first user and the second label value for the second user.

49. The computer program product of claim 48, wherein the social relationships associated with the first user comprise a group membership or a friendship.

50. The computer program product of claim 48, wherein the label comprises advertising keywords selected by advertisers, non-advertising keywords based on content of profiles and not selected by advertisers, text associated with advertisements a user previously selected, or categories that encompasses a plurality of either advertising or non-advertising keywords.

51. The computer program product of claim 48, wherein the operations further comprise generating a first graph comprising nodes for each user of the social network, wherein the nodes are linked based on the social relationships associated with the users of the social network.

52. The computer program product of claim 51, wherein the first graph further comprises nodes associated with label values selected from a group consisting of group nodes representing groups of users, label nodes representing labels, advertiser nodes representing advertisers, and nodes representing advertising keyword groups.

53. The computer program product of claim 52, wherein the operation further comprise determining label values for a portion of the nodes of the first graph, the determination comprising for each node of the portion, adding the node's current label value to a weighted value of a neighboring node's label value, for each neighboring node.

54. The computer program product of claim 53, wherein the weighted value is based on an edge that links the nodes.

55. The computer program product of claim 52, wherein the nodes are further linked based on relationships specified by the advertisers, relationships specified by an advertisement server, or relationships specified by a text classification algorithm.

56. The computer program product of claim 51, wherein the operations further comprise generating a second graph having nodes associated with the users of the social network, wherein the label values are assigned to the nodes using label nodes having a plurality of static label values.

57. The computer program product of claim 56, wherein the operation further comprise determining label values for output using both the first and second graph.

58. The computer program product of claim 48, wherein the operation further comprise selecting an advertisement to display in association with the first user based on the determined first label value for the first user.

59. The computer program product of claim 48, wherein the operation further comprise outputting, for the first user, additional label values for different labels based on the label values for the first plurality of users.

60. The computer program product of claim 59, wherein the operations further comprise selecting a label with the greatest label value to associate with the first user; and
   selecting an advertisement to display in association with the first user based on the selected label.

61. The computer program product of claim 59, wherein the operation further comprise normalizing the first label value and additional label values for the first user.

* * * * *

UNITED STATES PATENT AND TRADEMARK OFFICE
CERTIFICATE OF CORRECTION

| | | |
|---|---|---|
| PATENT NO. | : 8,055,664 B2 | Page 1 of 1 |
| APPLICATION NO. | : 11/742995 | |
| DATED | : November 8, 2011 | |
| INVENTOR(S) | : Baluja et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 495 days.

Signed and Sealed this
Twentieth Day of March, 2012

David J. Kappos
*Director of the United States Patent and Trademark Office*